US012609463B2

(12) United States Patent
Wilken

(10) Patent No.: US 12,609,463 B2
(45) Date of Patent: Apr. 21, 2026

(54) MODULE CONNECTOR AND CONTACT PROTECTION ELEMENT

(71) Applicant: Auto-Kabel Management GmbH, Hausen i.W. (DE)

(72) Inventor: Andre Wilken, Kleines Wiesental (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 375 days.

(21) Appl. No.: 18/253,865

(22) PCT Filed: Nov. 16, 2021

(86) PCT No.: PCT/EP2021/081762
§ 371 (c)(1),
(2) Date: May 22, 2023

(87) PCT Pub. No.: WO2022/106380
PCT Pub. Date: May 27, 2022

(65) Prior Publication Data
US 2024/0006782 A1      Jan. 4, 2024

(30) Foreign Application Priority Data

Nov. 23, 2020     (DE) ..................... 10 2020 130 894.9

(51) Int. Cl.
| *H01R 4/30* | (2006.01) |
| *F16B 37/06* | (2006.01) |
| *H01M 50/503* | (2021.01) |
| *H01M 50/517* | (2021.01) |

(Continued)

(52) U.S. Cl.
CPC ........... *H01R 4/305* (2013.01); *F16B 37/061* (2013.01); *H01M 50/503* (2021.01);

(Continued)

(58) Field of Classification Search
CPC .... H01R 4/305; H01R 2201/26; H01R 13/44; F16B 37/061; F16B 37/06; H01M 50/503;

(Continued)

(56) References Cited

U.S. PATENT DOCUMENTS

| 11,870,170 B2 * | 1/2024 | Reepen ............... H01R 13/5219 |
| 2024/0006782 A1 * | 1/2024 | Wilken ............... H01M 50/588 |
| 2024/0372277 A1 * | 11/2024 | Weinbrich .............. B60L 53/16 |

FOREIGN PATENT DOCUMENTS

| CN | 204407601 U | 6/2015 |
| DE | 102007057082 A1 | 5/2009 |

(Continued)

OTHER PUBLICATIONS

International Searching Authority/EP; International Search Report and Written Opinion on the International Searching Authority, Application No. PCT/EP2021/081762, dated Apr. 29, 2022; 28 pages.

(Continued)

*Primary Examiner* — Abdullah A Riyami
*Assistant Examiner* — Nader J Alhawamdeh
(74) *Attorney, Agent, or Firm* — Merchant & Gould P.C.

(57) ABSTRACT

Connector, in particular module connector, in particular battery module connector, in particular for vehicles with an electric drive, comprising a first connecting element which can be electrically conductively connected to a second connecting element, the first connecting element having a socket with an axially extending shaft with a through-opening and a radially extending collar, and wherein a screw element and a contact protection element are arranged on the first connecting element, wherein the contact protection element is arranged on the side facing the collar.

23 Claims, 20 Drawing Sheets

(51) Int. Cl.
  H01M 50/588      (2021.01)
  H01M 50/59       (2021.01)
(52) U.S. Cl.
  CPC ....... H01M 50/517 (2021.01); H01M 50/588
      (2021.01); H01M 50/59 (2021.01); *H01M*
    *2200/00* (2013.01); *H01M 2220/20* (2013.01);
                *H01R 2201/26* (2013.01)
(58) Field of Classification Search
  CPC .. H01M 50/517; H01M 50/588; H01M 50/59;
        H01M 2200/00; H01M 2220/20; H01M
                    50/51; Y02E 60/10
  See application file for complete search history.

(56)                 References Cited

FOREIGN PATENT DOCUMENTS

| DE | 102017103958 A1 | 9/2017 | |
|---|---|---|---|
| DE | 202018100111 U1 * | 9/2018 | ........... H01R 13/447 |
| DE | 102018201439 A1 | 8/2019 | |
| EP | 3869619 A1 | 8/2021 | |
| JP | 2010-040254 A | 2/2010 | |
| WO | 2020/207721 A1 | 10/2020 | |
| WO | 2022/037843 A1 | 2/2022 | |

OTHER PUBLICATIONS

German Patent Office, Office Action, Application No. 10 2020 130
894.9, dated Jul. 9, 2021; 12 pages (in German).

\* cited by examiner

MODULE CONNECTOR AND CONTACT PROTECTION ELEMENT

CROSS-REFERENCE TO RELATED APPLICATIONS

This application is the national phase entry of international patent application no. PCT/EP2021/081762, filed Nov. 16, 2021 and claims the benefit of German patent application No. 10 2020 130 894.9, filed Nov. 23, 2020, the disclosures of which are incorporated herein by reference in their entirety.

TECHNICAL FIELD

The subject matter relates to a connector, in particular a module connector, especially a battery module connector for vehicles with an electric drive.

BACKGROUND ART

The connection of electrically conductive components is always critical with regard to, on the one hand, the electrical contact resistance and, on the other hand, the necessary protection against contact. Elementicular attention must be paid to protection against contact, especially for components with voltages above 12V, preferably above 48V. This is particularly important in the industrial assembly of battery modules to form complete batteries, since the safety of the fitters is a high priority.

Battery modules, especially for traction batteries of electrically powered vehicles, are made of battery cells connected in series and in parallel. The battery cells within a battery module are connected to each other in series and in parallel via cell connectors. An output voltage of at least 48V or 60V, for example, is applied to the respective electrically outer cell connectors of a battery module due to the series connection of a plurality of battery cells. Such output voltages at a battery module are usually unproblematic. Nevertheless, these poles can already be provided with contact protection.

However, if several battery modules are electrically connected in series for a traction battery, the voltage between the outer poles increases with each additional module by the voltage of the additional module in each case. Thus, with three modules connected in series, a voltage of e.g. 180V can already be present between the outer battery poles. During assembly, battery modules are gradually connected together and the voltage between the outer poles of the series-connected modules increases with each new module. At the latest from the second module on, it is mandatory to provide a contact protection during the assembly of the module connectors.

Not only in the case of the connection of battery modules to each other, but also in the case of the connection of a battery module to a module connector, or the connection of a module connector to another conductor, or the connection of two conductors to each other, as well as the connection of a conductor to another electrical add-on element, a contact protection can become necessary.

In known module connectors, such as those known from European patent application EP 3 419 119, the tips of the fastening elements can be protected by protective pins, so that contact protection is provided at the outer tips of the fastening elements.

In the case of a contact protection known from this, however, the screw element may be in electrical contact from its upper side with a live part, so that a voltage flashover may occur on the upper side of the screw. For protection, the screw can be covered with a protective cover, but then screwing is no longer possible.

On the other hand, the electrical contact resistance at a connection point is of great importance. Elementicularly in traction batteries, but also in many other applications, especially automotive ones, high currents flow through the electrically conductive connections. The power loss increases quadratically with the current and linearly with the contact resistance.

Low electrical contact resistance is achieved by a large contact region. However, in the module connector known from EP 3 419 119, the contact surface is merely an end face of a connecting element. The surface region of such an end face is tightly limited due to the requirement for contact protection. In particular, a test finger must not come into contact with the live parts, so that a gap on the insulating housing must not become too large. In the known solution, however, this gap defines the size of the end face and thus of the contact region.

The subject matter was based on the object of providing a connector that provides safe contact protection on both sides with low contact resistance.

SUMMARY OF THE INVENTION

The connector in question is used for the electrically conductive connection of two electrical components. This includes, for example, a connection of an electrical line to an electrical add-on element, for example a battery terminal, in particular of a battery module, the connection of two electrical lines to one another, the connection of a module connector to a cell connector or the connection of a line to another component.

An electrical line can be a flat line, in particular a stranded line or a line made of solid material. The electrical line can be formed from an electrically conductive material, in particular from electrically conductive metallic material. The metallic material is preferably copper or a copper alloy. The metallic material may also be aluminum or an aluminum alloy. The conductive material may be conductively coated, in particular metallically coated, for example sub-nickel plated and/or tin plated. A coating with silver, gold or other precious metals is also conceivable.

The connector has a first connecting element which can be electrically conductively connected to a second connecting element. The second connection element may be a connector complementary to the connector according to the subject matter. The second connecting element may be a second electrical line, a terminal bracket on an electrical component, or an electrical component itself.

Electrically conductive components of the connector are formed In particular from an electrically conductive material mentioned above. The aforementioned conductive materials are not only used for the first connection element, but can also optionally be used for the second connection element. The conductive materials of the electrically conductive components, in particular of the connecting elements and/or of the conductors, may be different or identical to each other.

The first connecting element preferably has a socket with an axially extending shaft with a through opening extending in the axial direction and a collar extending in the radial direction. It is also possible for the first connecting element to be cup-shaped with a through opening extending in the axial direction at the bottom as well as the collar.

The collar serves to connect the connecting element to an electrical conductor. The shaft or cup is for receiving a fastening element and for making electrical contact with the second connecting element.

The fastening element and a contact protection element are arranged on the connecting element. Via the fastening element, a non-positive and/or positive connection can be made between the first connection element and the second connection element, in particular at least in the axial direction. The contact protection element serves to protect the fastening element against unintentional contact, in particular before and during the connection of the two connecting elements.

The fastening element can be guided through the through-opening and point with its bolt in the axial direction in the direction of the second connecting element. The contact protection element can be arranged on the collar in the axial direction on the side facing away from the shaft. With the aid of the contact protection element, it is possible to secure the fastening element against unintentional contact. In particular, this securing is to take place during screwing. However, for the purpose of optimizing installation space, the fastening element is to be secured against contact on the side facing away from the bolt after the two connecting elements have been joined, and the contact protection element is to be removable.

For this purpose, it is proposed that the contact protection element has a dome and that the fastening element is axially movably guided in the dome. The fastening element has a radially extending head and an axially extending bolt. Fastening means are arranged on the bolt to be connected to the second connecting element.

The fastening means of the fastening element may be formed of a thread, a bayonet lock, a twist lock or the like. To connect the two connecting elements to each other, the fastening element can be moved about the axial axis, in particular by means of screw movements. Therefore, the fastening element may also be referred to as a screw element. Whenever the term "screws", "screw element" or the like is used in the following, this always refers to all conceivable fastening means.

Now, in order to ensure that the fastening element does not come into electrical contact with live parts prior to assembly of the connector, it is proposed that the head rests against at least elements of an inner lateral surface of the dome. The dome is shaped in such a way that the fastening element is held against loss at least in the axial direction before being screwed into the contact protection element. In this case, the fastening element can be held non-positively, in particular with its head non-positively, against parts of the inner lateral surface of the dome. The frictional connection is In particular such that the fastening element can be displaced in the axial direction by means of a tool and is mounted rotatably about the axial axis. By fixing the head in the dome, the fastening element can be inserted into the dome, but it does not slip abruptly through the dome onto possibly live parts of the first and/or second connecting element. In the fixed state in the dome, the bolt is spaced from the first and/or second connecting element in the axial and/or radial direction. This also applies in the case where the contact protection element is fixed to the connecting element.

In the present case, the inner lateral surface of the dome is profiled along a section in the axial direction, that is, in a longitudinal section through the dome, parallel to the longitudinal axis of the fastening element and In particular in the direction of movement of the fastening element in the axial direction during connection, the inner lateral surface has a profiling such that the opening cross section of the dome varies. The opening cross-section can also be referred to as the diameter or the free diameter or the clear width of a through opening of the dome at its inner lateral surface. This allows the fastening element, in particular the head of the fastening element, to bear inwardly against the inner lateral surface of the dome, depending on its axial position when connected, with a variable radial force depending on the axial position of the fastening element relative to the dome. This makes it possible, on the one hand, to fix the fastening element in the dome in such a way that it cannot be lost before connection, and, on the other hand, to allow the fastening element to rotate freely in the dome and be displaced in the axial direction during connection, and finally, in a screwed position, to press the inner lateral surface of the dome outward through the head with a radial force, so that the contact protection element can be removed without tools by the fastening element after the connectors have been connected. Fixing the fastening element is advantageous because it can be brought together with the contact protection element as an assembly for mounting. After the contact protection element has been fixed at the mounting position, in particular at the first connecting element, as will be described below, the contact protection element together with the fastening element is mounted there in such a way that it cannot be lost. A further advantage of the radial spreading of the dome in the holding region is that this radially outwardly acting force presses the dome radially inwardly in the locking region. The fastening element at the holding region exerts a torque on the lateral surface of the dome, which results in the lateral surface of the dome on the opposite side being pressed inwards with a force in the longitudinal direction, i.e. the locking region, thus improving the locking.

Before connecting, the fastening element is thus mechanically secured within the contact protection element so that it does not come into contact with live parts. During connecting, the fastening element, being inside the dome, is guided by the wall of the dome protected against contact. At the end of the connection, in particular when the fastening element is fixed to the second connection element and carries voltages, the contact protection element can be removed. Here, the contact protection is provided by the fact that the head of the fastening element has an electrically insulating coating on its side opposite the bolt. The contact protection element thus has a contact protection function during connection of the fastening element and, on the other hand, can be removed after connection to optimize installation space.

Since the fastening element or the bolt of the fastening element is held in the contact protection element before connection in such a way that it does not come into contact with live parts, in particular does not come into contact with the first connection element and/or the second connection element, it is possible to dispense with insulation of the bolt or other contact protection at the tip of the bolt. Therefore, it is also possible to equip the bolt with large diameters, since no contact protection on this, which is costly in terms of installation space, is necessary. Only the outer diameter has to be adapted to a larger bolt, but the installation height is regularly the more relevant dimension.

As already explained, the inner lateral surface of the dome is profiled in a longitudinal section. An opening cross section defined by the inner lateral surface of the dome thus varies according to the profiling. In the region of a first end face of the dome, in particular in a region facing away from the collar, the dome has a holding region. The opening cross section of the dome in the holding region is such that the fastening element is held with its head in an axial position. The inner circumferential surface of the dome exerts a radially inward force on the circumferential surface of the head, so that the latter is preferably held in position by friction. Thus, an axial force in excess of the fastening element's own weight is required to overcome the frictional resistance and move the fastening element in the axial direction with its head out of the holding region. In the holding region, the opening cross-section of the dome is thus reduced, in particular smaller than the cross-section of the head. The circumferential surface of the head rests at least partially against the inner lateral surface of the dome in the holding region. The holding region preferably has at least the same axial extent as the head, in particular the circumferential surface of the head. The head of the fastening element is preferably held in the holding region in an interference fit in the dome. Fixing the fastening element in the holding region ensures that the fastening element with its bolt does not come into contact with live parts in the unconnected state.

The contact protection element together with the fastening element held in the holding region can be put together as an assembly and fixed to the first connecting element as described below.

The fixing to the first connecting element can be such that the contact protection element is held on the first connecting element in such a way that it cannot be lost, in particular by means of a form fit. The profiling of the inner lateral surface of the dome can be such that the contact protection element can be detached from the connecting element by an axial displacement of the fastening element within the dome, in particular in that a form fit between the contact protection element and the first connecting element is cancelled by an axial displacement of the fastening element.

According to an embodiment, it is proposed that In particular on the region of the dome axially opposite the holding region, the latter has an spreading region. In this spreading region, the opening cross-section of the dome is tapered, in particular smaller than the opening cross-section in the holding region. In the connected state of the contact protection element and the first connecting element, the spreading region faces the collar of the connecting element. The spreading region is such that the fastening element exerts a radially outward force with its head on the outer surface of the dome when the head is in the spreading region.

The wall of the dome is preferably axially slotted in the spreading region. A radially outwardly acting force exerted by the head on the wall of the dome in the spreading region leads to elastic spreading of the opening cross section of the dome as well as to rocking of the wall about a deflection point located in the transition region, as will be described below. This spreading can release a form fit between the dome and the connecting element. Spreading can be carried out with a lower force due to the slotting. When spreading in the spreading region, the wall of the dome in the holding region is preferably moved radially inwards. Conversely, when the holding region is spread, the wall of the dome in the spreading region is moved radially inward.

According to an embodiment, a transition region can lie between the spreading region and the holding region in the axial direction. This transition region has an enlarged opening cross-section compared to the holding region and the spreading region, so that the head is guided therein with a clearance fit. The clearance fit means that the fastening element can be displaced in the axial direction essentially without frictional losses. Rotation of the fastening element in the transition region is preferably possible substantially without friction of the fastening element, in particular of the head, against the inner lateral surface of the dome. The head is preferably guided in the transition region in a clearance fit in the opening cross-section. The largest diameter of the head is preferably smaller than the smallest diameter of the opening cross section in the transition region. In the transition region, segments of the dome separated from one another by the axial slots can be connected to one another in the slots by webs extending between the segments.

Starting from an upper end face, the dome extends in the axial direction via the holding region, the transition region and the spreading region to a lower end face. In the region of the lower end face, the dome can have a flange pointing radially outwards. In the region of the lower end face, starting from the lower end face, the dome can have at least two, preferably at least four or more slots extending axially in the wall of the dome, which slots extend In particular over the spreading region, in particular as far as the transition region. The slits divide the wall of the dome into segments. The segments are distributed In particular over equal angular sections of the dome. In particular, four or more segments are provided. The segments are connected to one another via webs in the slots.

The opening cross section of the dome is limited by the inner lateral surface of the wall of the dome. The opening cross-section in the transition region is larger than the opening cross-section in the spreading region and the opening cross-section in the holding region. Preferably, the opening cross section in the holding region is larger than the smallest opening cross section in the spreading region. Tapered or fillet-shaped profiling can be provided at the transitions between the individual regions so that a substantially stepless transition is formed between the regions and thus the head can slide between the individual regions in the axial direction without tilting.

In the connected state between the contact protection element and the first connecting element, a positive lock may be formed between them. For this purpose, a locking element on the outer and/or inner end edge of the lower end face of the contact protection element and a locking element on the side of the collar facing the contact protection element can engage behind one another.

In particular, it is proposed that a locking element is arranged on the surface of the collar assigned to the dome, which locking element corresponds to a locking element arranged on the lower end face of the dome, in particular is complementary thereto. In particular, it is proposed that the locking elements engage behind one another in the radial direction. The locking elements can be formed in the manner of snap locks, each with an opening cross section that increases in the radial direction. When the locking elements are pushed together, the undercuts lock into one another. In particular, the locking element of the dome is spread radially outward when pushed together, and when locked the locking element of the dome springs radially inward behind the locking element on the collar and a positive lock is formed.

Due to the radial spreading of the dome in the spreading region described above, in particular caused by the axial displacement of the fastening element within the dome, this form closure can be released when the fastening element is fixed. To put it in other words, the contact protection element for connecting to the first connecting element can be pressed against its collar with an axial contact force and the locking elements lock together so that the contact protection element is held against the collar in a substantially loss-proof manner. The locking of the locking elements may alternatively or cumulatively be enhanced by the fastening element being pushed into the holding region. As previously described, the head of the fastening element radially pushes apart the dome in the holding region, thereby radially compressing the dome in the locking region. This results in mutual securing between the locking element and the contact protection element. It is possible that the fastening element is first inserted, in particular pressed, into the contact protection element in the axial direction. The fastening element may then first be seated loosely on the inner lateral surface of the dome in the holding region. If the assembly of fastening element and contact protection element is then latched onto the connecting element, this is done with greater force. Subsequently, the fastening element is also held correspondingly better in the holding region and the contact protection element can only be released again with great effort as long as the fastening element is seated in the holding region.

Due to the profiled opening cross-section of the inner lateral surface of the dome, this locking can be released by spreading the wall of the dome when the fastening element is moved axially into the spreading region, and the contact protection element can be removed from the collar without tools.

The locking elements are such that the contact protection element cannot be released from the collar in the locked state without the spreading by the fastening element in a non-destructive manner. In particular, when the head of the fastening element presses the wall of the dome outward in the holding region, this causes a radially inward force on the wall of the dome in the spreading region and consequently in the region of the locking elements. This fixes them with an additional force. When the head is in the spreading region, the spreading of the wall of the dome caused by the head of the fastening element presses the locking element of the dome radially outwards. This allows the interlock with the locking element of the fastening element to be released. The contact protection element can then be removed from the collar without tools or destruction.

According to one embodiment, it is proposed that a dimension of overlap of the undercuts in the connected state is smaller than or equal to a taper of the radius of the opening cross section in the spreading region. The fastening element is guided into the spreading region during joining. The head of the fastening element presses against the inner wall of the dome in the spreading region with a force acting radially outward. The tapering of the radius of the opening cross-section results in elastic deformation of the dome in the spreading region, during which the wall of the dome is pressed outward. If the taper of the radius is greater than or equal to the overlap of the undercuts, the elastic deformation during spreading means that the undercuts no longer engage behind each other in the spread state. The contact protection element can be removed from the first connecting element without tools. Only the frictional force exerted by the head of the fastening element on the inner lateral surface of the dome in the spreading region must be overcome to remove the fastening element.

In the connected state, the bolt of the fastening element protrudes into the socket or cup of the first connecting element. The inner lateral surface of the through hole and/or the socket of the connecting element may be coated in an electrically insulating manner, so that the bolt of the fastening element does not come into contact with the material of the first connecting element.

According to one embodiment, it is proposed that an axial extension of the transition portion or the transition portion and the expansion portion is less than an axial extension of the bolt. Thus, when the head is located in the holding portion, the bolt can protrude from the lower end surface of the contact protection element, which makes it easier to thread the bolt into the through hole of the first connecting element.

When the fastening element is inserted into the contact protection element, it is inserted into the dome with the bolt leading. The head is inserted through an opening on the upper face that tapers into the dome in the axial direction. The taper of the opening cross-section of the dome can be such that the opening cross-section is smaller than the diameter of the head. To insert the head, the wall of the dome can be elastically spread radially outward. The opening of the dome can expand outward in the axial direction after tapering in the radial direction. The holding region starts at the radial widening of the opening, in the axial direction behind the taper. The head can thus be inserted into the holding region in the manner of a snap connection. The radial expansion allows the head to abut the wall of the taper in the axial direction. The head is then held in the holding region by the radial expansion, so that the fastening element is held in the contact protection element in the axial direction in the direction of the upper end face.

In this state, the bolt projects beyond the lower end face of the dome. With this protrusion projecting beyond the front edge of the dome, the fastening element can be fitted onto the first connecting element together with the contact protection element, in particular can be inserted into the through-opening. The bolt can be used to align this assembly to the first connecting element, in particular by threading the bolt with its protruding region into the through opening of the first connecting element. Moreover, in this process, the contact protection element can be latched to the first connecting element in the manner described above.

Preferably, the inner lateral surface of the socket, in particular the inner lateral surface of the through hole, is insulating coated so that the bolt of the fastening element does not come into contact with an electrically conductive element when it is threaded into the through hole. The assembled assembly of the contact protection element, the fastening element and the first connection element can then be aligned with the second connection element.

According to one embodiment, it is proposed that the dome is slotted in the spreading region. The slots preferably extend in an axial direction. The slots are arranged at preferably equidistant angular distances from each other on the dome. The slots allow radial outward spreading of the wall of the dome when the head of the fastening element presses the inner wall of the dome outward in the spreading region.

The dome is preferably slotted from the spreading region to the holding region. The slots preferably extend in the axial direction. The segments of the dome spaced apart by the slots are preferably connected to one another by webs. The webs preferably run in a plane perpendicular to the longitudinal axis of the dome. The webs are preferably formed integrally with the material of the segments of the dome. The webs act in the manner of a hinge or a deflection point between the holding region and the spreading region.

This hinge function of the webs allows the locking elements to "rock" around them. This results in the fastening element being able to be inserted into the contact protection element with little axial force. The rocking function causes the holding region to expand radially and the spreading region to move radially inward at the same time. This allows the assembly of fastening element and contact protection element to be joined easily.

If the fastening element is in the holding region, the rocker can no longer open in the spreading region without an increased radial force. If the assembly of fastening element and contact protection element is now locked onto the connecting element, this is done by spreading the locking elements radially outward by applying an axial force to the dome. If the dome opens in a trumpet shape in the spreading region, this facilitates radial spreading due to an axial contact force.

Subsequently, both the spreading region is pressed outward by the connecting element and the holding region is pressed outward by the fastening element. In this way, the fastening element and the contact protection element secure each other. The contact protection element sits securely on the connecting element and cannot fall off during transport.

The rocker does not function again until the fastening element is moved out of the holding region into the transition region during subsequent fastening to the second connecting element. The holding region can then be moved radially inwards, which facilitates radial movement or spreading outwards of the spreading region. After spreading, the contact protection element can be easily removed.

To enable good unlocking, it is suggested that the locking element on the dome be located in the spreading region, particularly in the region of the lower end face. The axial position of the spreading region and the locking element of the dome may be the same along the longitudinal axis of the contact protection element. This means that spreading the dome in the spreading region causes the greatest possible spreading of the locking element. In particular, both locking element and spreading region are oriented towards the lower end face.

Both the spreading region and the locking element can be at least partially circumferentially shaped. The locking element is In particular a circumferential ring, interrupted by the axial slots. The spreading region is In particular a circumferential, inwardly facing projection on the inner lateral surface of the dome, interrupted by the axial slots.

According to one embodiment, it is proposed that the bolt is formed as a screw or threaded socket. The bolt may be screwable, both as a male and as a female. In addition to the screw and threaded socket, a bayonet lock, a twist lock or the like may also be formed on the bolt. The fastening of the connecting elements by the fastening element is preferably performed in such a way that during fastening the bolt is rotated about its longitudinal axis. This causes the bolt to be displaced in the axial direction. This means that the fastening results in an axial displacement of the head arranged on the bolt, so that the head is forced out of the transition region into the spreading region by the fastening process. This can be done not only by bolt and thread but also by other connection concepts.

According to one embodiment, it is proposed that an outer circumferential surface of the shaft tapers in an axial direction away from the collar. The socket of the first connecting element extends in the axial direction with its through opening and the wall at least partially circumferentially bounding the through opening. At an upper end face in the region of the collar, the socket is formed with the through-opening for receiving the bolt. In particular, the through-opening of the socket has a first opening cross-section there which corresponds approximately to the cross-section of the bolt. Starting from this first opening cross-section, the through-opening of the socket extends in the longitudinal direction towards a lower end face. In the region of the second end face, the through opening of the socket has a second opening cross section which is larger than the first opening cross section. The inner lateral surface of the through opening of the socket may be circumferentially coated with an insulating material.

Starting from the upper end face, the shaft extends in the direction of the lower end face. The shaft has a preferably circumferential wall defining the through opening. The inner circumferential surface of the shaft, which bounds the through opening, may be insulating coated as described. The outer jacket surface of the shaft, in particular in a region of the lower front edge may be shaped to be longitudinally tapered, in particular conically tapered. The wall thickness decreases in the direction of the lower front edge.

The outer lateral surface may serve as a contact surface for electrical contact with the second connecting element. The lower end edge of the shaft, in particular the lower end surface of the shaft, may preferably be circumferentially insulated. The insulation of the lower end face of the shaft as well as of the inner lateral surface of the through opening may be integral, in particular injection-molded. The collar may be coated with an insulating material at least in parts on the upper end face. The coating may be In particular in the regions where the head does not rest. This ensures a good contact pressure of the head against the collar. In particular, the head can rest directly on the collar. However, the coating can also be full-surface. This coating can also be integral and, in particular, integral with the coating of the inner lateral surface of the through-hole. In this case, a coating of the above-mentioned coated surfaces can be applied in a single injection molding process.

Also, the first connecting element may be formed as a cup. It is understood that the second connecting element may be formed in a complementary manner in each case. To this extent, the description of socket and cup for the first connecting element can also be understood as a description of the respective complementary second connecting element. The features mentioned thus apply equally to the first and the second connecting element.

According to an embodiment, it is proposed that a cup formed by the inner circumferential surface of the cup expands in an axial direction pointing away from the collar. The cup of the first connecting element extends with its at least partially circumferentially bounding wall in the axial direction. At an upper end face in the region of the collar, the cup is formed with the through-opening for receiving the bolt. In particular, the through-opening of the cup has a first opening cross-section there which corresponds approximately to the cross-section of the bolt. The bottom of the cup has a cross-section that substantially corresponds to the upper end face of the shaft of the socket of the second connection element. Starting from the bottom of the cup, in which the through hole is, the cup extends longitudinally towards a lower end face. The outer lateral surface of the cup may be circumferentially coated with an insulating material.

The inner lateral surface of the cup, which bounds the passage opening, can be widened in the longitudinal direction, in particular can have a conically widening shape. The wall thickness decreases in the direction of the lower end edge.

The inner lateral surface may serve as a contact surface for electrical contact with the second connecting element. The lower end edge may preferably be circumferentially insulated. The insulation of the lower end face as well as the outer lateral surface may be integral, in particular molded-on. The collar may be coated with an insulating material at least in parts on the upper end face. The coating may be In particular in the regions where the head does not rest. This ensures a good contact pressure of the head against the collar. In particular, the head can rest directly on the collar. However, the coating can also be all-over. This coating can also be integral and, in particular, integral with the coating of the outer lateral surface of the cup. In this case, a coating of the above-mentioned coated surfaces can be applied in a single injection molding process.

As already explained, according to an embodiment, it is proposed that the collar is coated on the upper end face at least in parts in an electrically insulating manner, wherein the locking element is preferably integrally formed from the coating. Together with the coating, the locking element can also be manufactured in a single injection molding process. The electrically conductive core of the interlocking element, in particular comprising the socket with collar and shaft, can be inserted into an injection mold as an insert made of a conductive material. Subsequently, an overmolding of the insert may be substantially complete with the exception of at least the outer lateral surface of the tapered wall of the shaft. This may be free of insulation. This surface then serves as a connecting surface with the second connecting element.

According to one embodiment, it is proposed that an electrically insulating sleeve at least partially circumferentially surrounds the shaft and is spaced from the outer circumferential surface of the shaft in a radial direction so that an annular space is formed between the sleeve and the shaft. The electrically insulating sleeve may also be formed integrally with the other insulation. The insulation may be formed of an electrically insulating material, in particular a plastic, especially PVC, PC, PET, PBT, PA, PPA or PPS or the like. A thermoset or a liquid crystalline plastic are also possible.

In particular, the sleeve can be molded onto the collar as element of the injection molding process described. Preferably, the sleeve is formed completely circumferentially around the shaft. The sleeve extends in the axial direction starting from the collar along the shaft to at least the lower end edge of the shaft. The sleeve and the end face coating of the shaft can end in a common plane. The lower end face is then completely insulated. Only the annular space between the sleeve and the shaft allows access to the non-insulated outer lateral surface of the shaft. The radial distance between the inner edge of the sleeve and the outer edge of the shaft can be such that it is smaller than a test standard requires. This so-called finger gap is preferably smaller than 3 mm, in particular 2.8 mm, especially to comply with the IPXXB, DIN EN 60529 standard.

As already explained, the socket or cup has a through opening. This through-opening preferably has two different opening cross-sections, as also already described for the socket. For the cup, the through opening widens towards the lower end edge. At the upper end edge, on the side facing the collar, a first, smaller opening cross section can be provided. At an axial distance from the upper end edge, towards the lower end edge, a larger opening cross-section may be provided. As described, the inner lateral surface of the through opening is at least partially coated in an electrically insulating manner. Thus, when the bolt of the fastening element is inserted, contacting of the fastening element with electrically conductive surfaces of the first connecting element can be prevented.

For contacting the connecting element with an electrical conductor, it is possible to provide an opening, in particular a hole, in the electrical conductor. The connecting element can be inserted into this hole with its circumferential sleeve or the outer lateral surface of the cup. The collar completely encircles both the shaft. The collar preferably projects radially beyond the sleeve or cup. The collar has an insulating coating on its upper end surface and optionally on its circumferential wall. The collar may form a flange on a side facing the shaft. This flange may be at least partially uncoated.

The conductor can also be uncoated around the opening. The collar with its flange can be pressed against this uncoated, in particular non-insulated surface of the conductor. On its flange side, the sleeve preferably has an at least partially circumferential projection extending axially in the direction of the shaft and spaced radially from the shaft. This projection can be in the form of a weld pad, in particular arcuate or conical in cross-section. The welding support serves to increase the contact pressure of the collar against the conductor in the case of welding of the collar to the conductor.

To connect, the connecting element with the collar or the cup is inserted into the opening. The collar rests with its flange on the non-insulated surface of the conductor. Using a suitable welding tool, the connecting element, in particular the collar, especially the flange side of the sleeve, is pressed axially onto the conductor. In friction welding, the collar is rotated about its axis so that a material joint is formed. Another connection between the sleeve and the conductor is also possible, for example by means of resistance welding, laser welding, soldering or the like.

In order to connect the collar as flush as possible to the insulation of the conductor, in particular to ensure flush, complete insulation, it is proposed that the collar has a radially circumferential, external fold. This fold is used to accommodate insulation of the conductor. The rebate may also facilitate overmolding. The collar may be placed on the conductor so that the rebate is spaced circumferentially on the insulation or is directly against it, and the radially more interior portions of the collar are flanged to the uninsulated conductor. The fold should not rest on the insulation if friction welding is used.

According to one embodiment, it is proposed that the head of the fastening element is electrically insulating coated on its surface facing away from the bolt. The fastening element is preferably made of a metallic material. Since this material is electrically conductive and, in particular, the bolt of the fastening element may come into contact with conductive components when the fastening element is connected to the second connecting element as well as in the connected state of the connecting elements, the head of the fastening element may be coated in an electrically insulating manner.

In another aspect, there is provided a connector, in particular a battery module connector, in particular for vehicles having an electric drive system. This connector comprises a first connecting element as previously described, and a second connecting element. The connecting elements are electrically conductively connectable to each other. As previously described, a first electrically conductive surface is provided on the first connecting element at the outer lateral surface of the shaft. The second connecting element is formed as a socket having an axially extending cup-shaped shaft and a radially extending collar. An axially extending receiving part is provided within the cup-shaped shaft. The shaft as well as the collar are formed of a conductive material described above.

An inner lateral surface of the shaft may be formed electrically conductive and may be contacted with an outer lateral surface of the shaft of the first connecting element. The shaft of the first connection element and the shaft of the second connection element may be complementary to each other, such that the shafts may be slid into each other with their inner and outer lateral surfaces at least partially brought into electrically conductive preferably direct contact.

The shaft of the second connecting element can also be understood as a cup. The second connecting element is complementary to the first connecting element. The description of socket and/or cup of the first connecting element is thus analogously applicable to the second connecting element as well as vice versa the description of the second connecting element is analogously applicable to the first connecting element.

The cup-shaped shaft of the second connecting element opens up in an axial direction pointing away from the collar. This widening corresponds to the tapering of the shaft of the first connecting element.

The second connecting element has a lower end face in the region of the collar and an upper end face in the region of the shaft. The shaft opens from the collar to the upper face. When the connecting elements are joined, the first connecting element is moved with its lower end face towards the upper end face of the second connecting element. In the process, the shaft of the second connecting element slides into the annular space between the shaft of the first connecting element and the collar of the first connecting element. The shaft of the first connection element slides into the annular space between the shaft of the second connection element and the receiving part.

The shaft of the second connecting element circumferentially engages the receiving part extending axially within the shaft. The receiving part may be formed integrally with the shaft and the collar. In this case, an upper end surface of the shaft, circumferentially around the receiving part, may be electrically insulating coated. The coating may lie flat on the end face, as well as facing away from the shaft in the axial direction, having a preferably substantially circumferential elevation.

However, it is preferred if the receiving part is at least partially formed from an electrically insulating material. In particular, the receiving part may be molded to the shaft and the collar. In order to be able to establish mechanical stability between the fastening element of the first connection element and the receiving part of the second connection element, a connecting portion of the receiving part may be formed metallically in order to cooperate with the bolt of the fastening element of the first connection element. In particular, a sleeve-shaped insert may be inserted in the receiving part, said insert preferably being metallic. For example, the insert may be inserted into the receiving part as a threaded insert. In the joined state, the center axis of the insert is coaxial with the center axis of the through opening of the socket of the first connecting element and the center axis of the fastening element of the first connecting element, so that the receiving part and the fastening element can be screwed together.

According to one embodiment, it is proposed that an outer lateral surface of the shaft is coated in an electrically insulating manner. The shaft may have an outer, cylindrical jacket surface. Insulation may be provided on this. The upper end surface of the shaft may also be coated with the insulating material. The coating may be molded to the shaft together with the material of the receiving part.

According to one embodiment, it is proposed that the collar is at least partially uncoated on the side facing the shaft, the uncoated region being formed as a contact surface for an electrical conductor. In this case, the collar may be fully coated on the side facing away from the shaft. The connection of the collar of the second connecting element to the electrical conductor via the flange surface facing the shaft is preferably made in a manner corresponding to the connection of the collar of the first connecting element to the electrical conductor, so that reference is made in full to the description there.

However, the collar may also be at least partially uncoated on the side facing away from the shaft, the uncoated region being formed as a contact surface for an electrical conductor. In this case, the collar may be fully coated on the side facing the shaft.

According to an embodiment, it is proposed that the receiving part or the insert of the receiving part, respectively, are formed as a threaded socket or as a screw. In particular, an insert may be formed as a threaded socket. The fastening element can then be formed as a screw. In this case, it is preferred In particular if the threaded socket is embedded in the electrically insulating material of the receiving part. On the other hand, a sleeve with an external thread can be slipped onto the receiving part. The receiving part of the second connecting element is complementary to the fastening element of the first connecting element.

According to an embodiment, it is proposed that the insert, in particular the threaded socket is formed of an electrically conductive material. The collar is also preferably formed of an electrically conductive material. The threaded socket has an electrically insulating coating on its end face and/or on its outer lateral surface. Also, the end face of the receiving part may be at least partially formed of an insulating material.

An opening and an annular gap are formed between the receiving part and the inner lateral surface of the shaft. The shaft of the first connecting element can be inserted into this annular gap. A distance between the outer lateral surface of the screw element and an end inner edge of the shaft can be, for example, 3 mm, so that a test finger cannot come into contact with electrically conductive materials, in particular the inner lateral surface of the shaft.

In another aspect, a contact protection element for a connector is provided. Such a contact protection element has been described comprehensively in connection with the connector according to claims 1 to 20, and reference is made thereto in its entirety. The contact protection element preferably comprises a dome and a fastening element axially guided in the dome.

The fastening element has a radially extending head and an axially extending bolt. The head abuts at least portions of an inner lateral surface of the dome. Additionally, the inner lateral surface of the dome is profiled along a section in the axial direction. In particular, a holding region, transition region and spreading region are formed by a corresponding profiling. The opening cross-section of the dome can vary depending on the axial position. Transitions between different radii of the opening cross-section can be stepless, in particular by means of conical or arcuate expansions or constrictions at the radial projections.

In another aspect, there is provided a connector having a first connector portion and a second connector portion, wherein the shaft of the first connector portion engages the shaft of the second connector portion and the fastening element of the first connector portion is engaged with the receiving part of the second connector portion through the through opening of the shaft of the first connector portion and, in an unthreaded state, the head is retained in the holding region, in a transition state between the unthreaded state and a fully threaded state, the head is in the transition region, and in the fully threaded state, the head is in the spreading region, thereby spreading the wall of the dome radially outward.

According to one embodiment, it is proposed that the shaft of the first connecting element axially engages the shaft of the second connecting element at least partially in the region of the electrical conductor. The electrical conductors to be connected to each other can be placed on top of each other. Openings, in particular bores, can be formed in both electrical conductors to receive the first and second connecting elements, respectively. The first connecting element is inserted through the opening of a first conductor and the second connecting element is inserted through the opening of the second conductor. The collars of the two connecting elements can be connected to the respective conductor. Here, the collars can be connected on opposite sides of the conductors. It is also possible that the second connecting element is connected to a conductor with the collar on the side facing away from the shaft.

Subsequently, a contact protection element can be plugged onto the first connecting element in the manner described.

Subsequently, the two connecting elements can be plugged into each other, with the lateral surfaces of the shafts contacting each other and forming an electrical transition.

Unlike in the prior art, in which an electrical junction is formed at the end faces of the collars, an electrical junction is proposed here at the lateral surface of the shafts.

Preferably, the contacting sheath surfaces lie at least partially within the conductors to be connected, in particular within the openings in the conductors, at least within the opening of one of the conductors. Hereby, an enormous space saving is realized, since the electrical transition takes place within the opening of at least one conductor, and thus a considerably lower construction height can be realized than is possible in the prior art. Since the contact protection element can be removed after connection, this also does not contribute to the assembly height in the connected state.

According to an embodiment, it is proposed that an axial extension of the shaft of the first connecting element and/or the shaft of the second connecting element is smaller than a material thickness of an electrical conductor connected to the collar of the first connecting element and/or a material thickness of an electrical conductor connected to the collar of the second connecting element. In particular, a built-up height of the two electrical conductors together is smaller than an axial extension of the collar of the first connection element and/or the collar of the second connection element.

In another aspect, there is provided a handling device for a contact protection element with a fastening element. The handling device has a receptacle for the contact protection element and a rotating element for the fastening element. The rotating element is rotatably arranged within the receptacle. A position sensor is provided, with which the axial position of the rotating element in the receptacle can be determined. The sensor can be used to determine when the rotating element has rotated the fastening element in/out. It is also possible that the fastening element and/or the receiving part can have different designs, so that in each case a first pair of fastening element and/or the receiving part has a first mechanical design and a second pair of fastening element and/or the receiving part has a second mechanical design, so that when the fastening element is fastened it behaves differently depending on the mechanical design. This may be, for example, the thread pitch in the case of a screw connection. A different axial displacement path of the fastening element can be specified per revolution. The sensor can then detect which pair has just been fastened with the handling device. This can be relevant, for example, if the negative pole and the positive pole of a battery module are to be mounted/dismounted in a specific sequence. The handling device can use the sensor to monitor compliance with this sequence and output an error signal if the sequence is incorrect.

The rotating element is spring-mounted in the holder for precise evaluation of the axial displacement path of the fastening element in the axial direction.

A torque sensor can also be provided. The torque with which the fastening element is tightened depends on whether the fastening element is inserted in the contact protection element or not. In the contact protection element, there is an increase in torque in the holding region and in the spreading region due to the radial clamping, as described above. This results in monitoring of whether the contact protection element is present.

An optical sensor can also be provided on the handling device. This sensor can, for example, read an optical identifier, e.g. a bar code, a QR code or a data matrix. This identifier can be, for example, an identifier of a battery module. Thus, an identifier of a battery module can first be read with the handling device and then the data of the torque sensor and/or the data of the position sensor can be assigned to this battery module. This makes it possible to assign assembly data to a battery module.

A presence sensor can also be provided on the handling device to detect whether there is a contact protection element in the holder. Only if this is the case can the rotating element be activated, for example. This ensures that mounting/dismounting of the fastening element can only be carried out with a contact protection element. During assembly, it can be checked whether the contact protection element has remained on the handling device after it has been lifted off the screw. During disassembly, it can be checked whether a contact protection element was fitted before the screw was unscrewed.

A suction device can also be provided in or on the holder. This can be activated when one of the sensors detects that the fastening element is fully fastened and automatically attaches/removes the touch protection element.

BRIEF DESCRIPTION OF THE DRAWINGS

The subject is explained in more detail below with reference to drawings showing embodiments. The drawings show:

FIG. 2a a longitudinal section through a connector according to FIG. 1a;

FIG. 5b a view of an overmolded socket according to FIG. 5a;

FIG. 5c a sectional view of the socket according to FIG. 5a;

FIG. 6b a view of an overmolded socket according to FIG. 6a;

FIG. 6c a sectional view of the socket according to FIG. 6a;

FIG. 11 a longitudinal section through a connector in the manner of FIG. 2a.

DETAILED DESCRIPTION OF SPECIFIC EMBODIMENTS

Figure 1A:
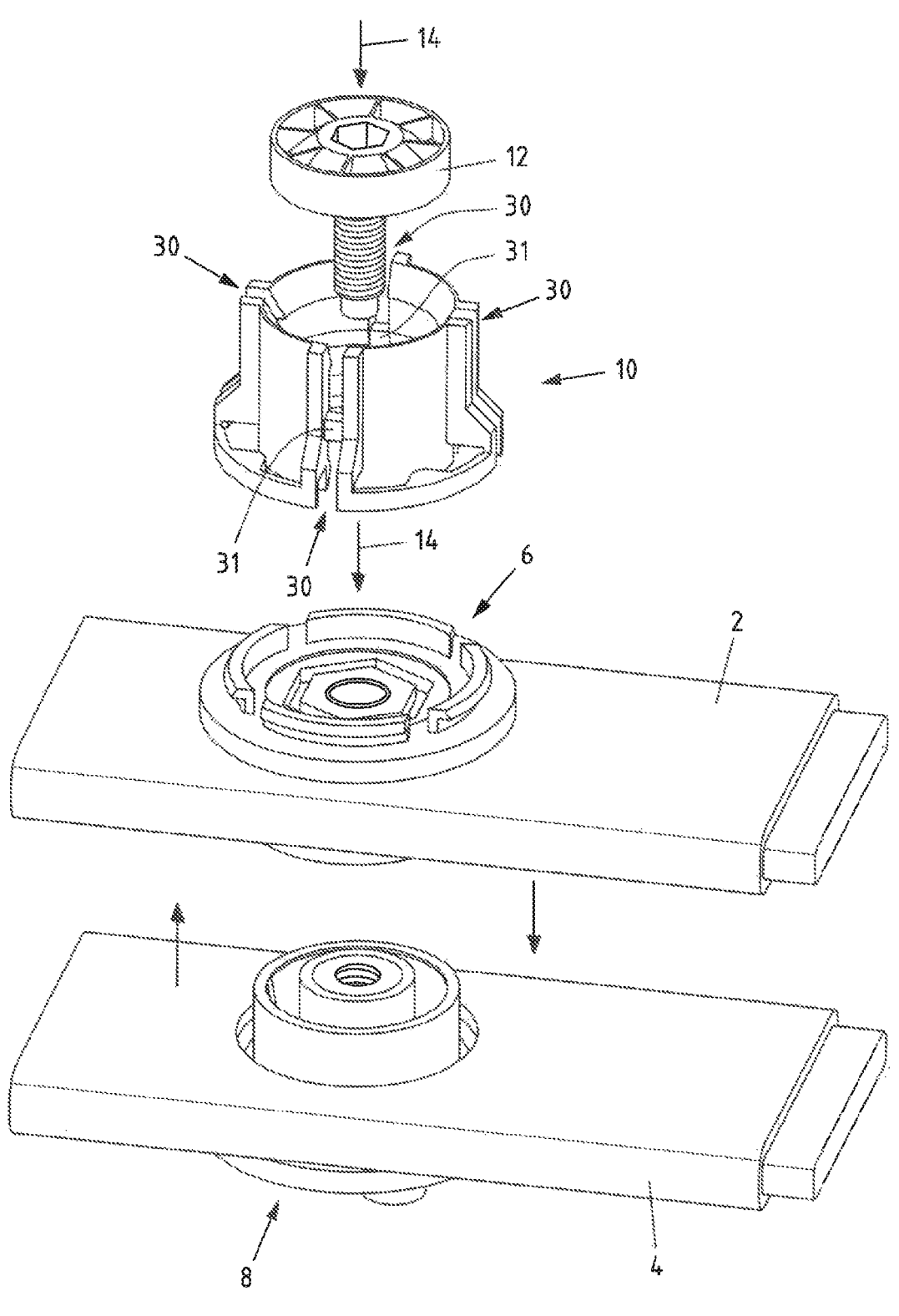
FIG. 1a an exploded view of a subject connector according to an embodiment.

FIG. 1a shows the connection between a first electrical conductor 2 and a second electrical conductor 4 using a first connection element 6 and a second connection element 8, as well as a contact protection element 10 and a fastening element 12. With regard to the fastening element 12, it should be noted that here the fastening element 12 is shown as a screw which interacts with a threaded sleeve. However, it is within the scope of the usual to design the fastening element 12, for example, as a threaded sleeve interacting with a screw on the second connecting element. The fastening element 12 is described below as a screw element 12, but of course also includes all other conceivable and In particular above-described fastening elements.

It can be seen that the first connecting element 6 is inserted through an opening of the first conductor 2 and the second connecting element 8 is inserted through an opening of the second conductor 4. The openings are provided In particular in stripped regions of the conductors 2, 4. In the unconnected state, the contact protection element 10 can be plugged onto the first connection element 6 in the direction 14. The screw element 12 is inserted into the contact protection element 10 in the direction 16. The assembly consisting of the first connecting element 6, the contact protection element 10 and the screw element 12 is plugged onto the second conductor, i.e. the second connecting element 8, in the direction 18.

Figure 1B:
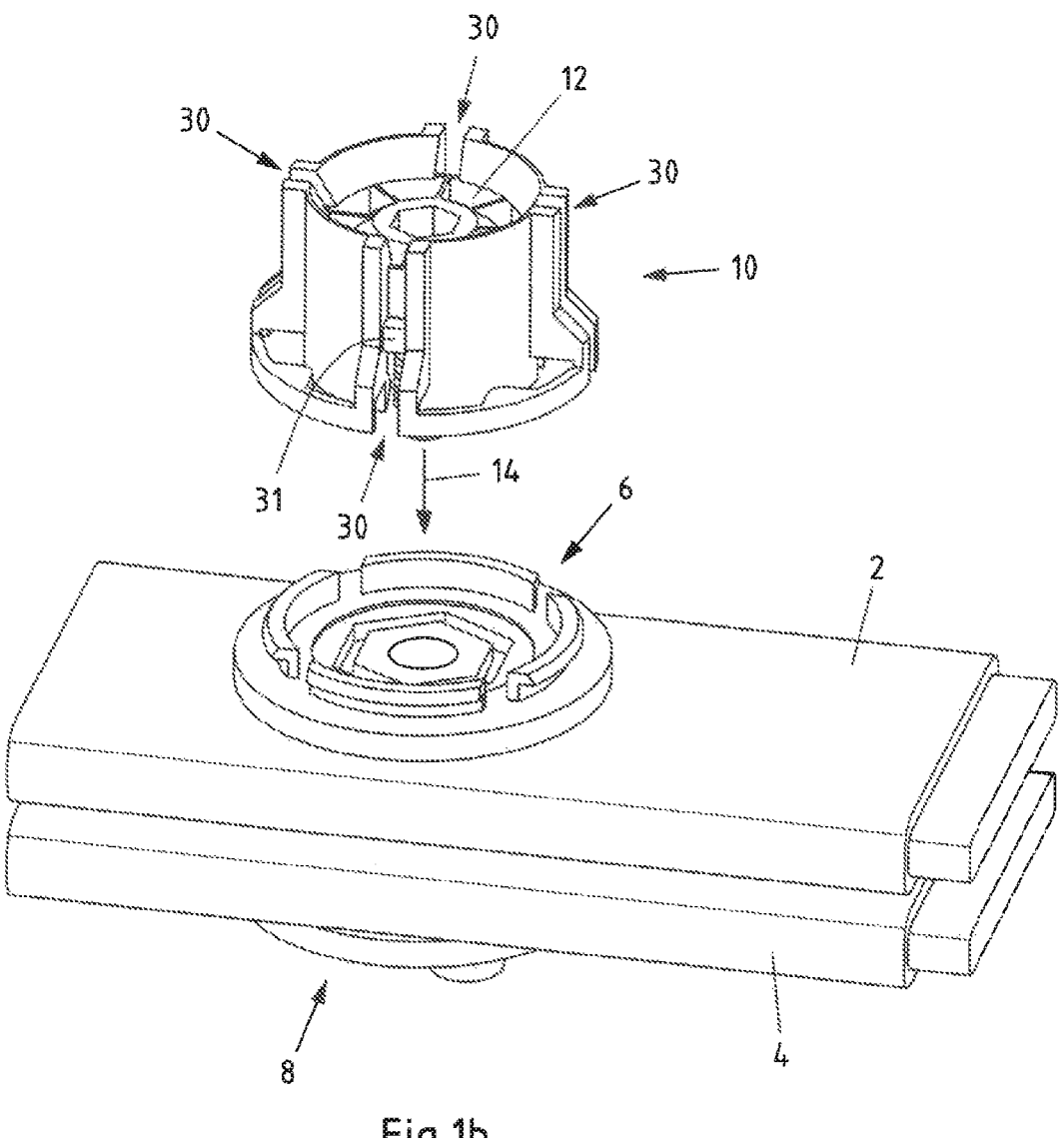
FIG. 1b the view according to FIG. 1a with interlocking connection elements.

FIG. 1b shows how the conductors 2, 4 are laid overlapping each other. The connecting elements 6, 8 are pushed through the conductors 2, 4 and inserted into each other with their shafts. In addition to successive assembly, the contact protection element 10 together with screw element 12 and conductor 2 can also be plugged onto the first connecting element 6 as will be described below and locked there.

Figure 1C:
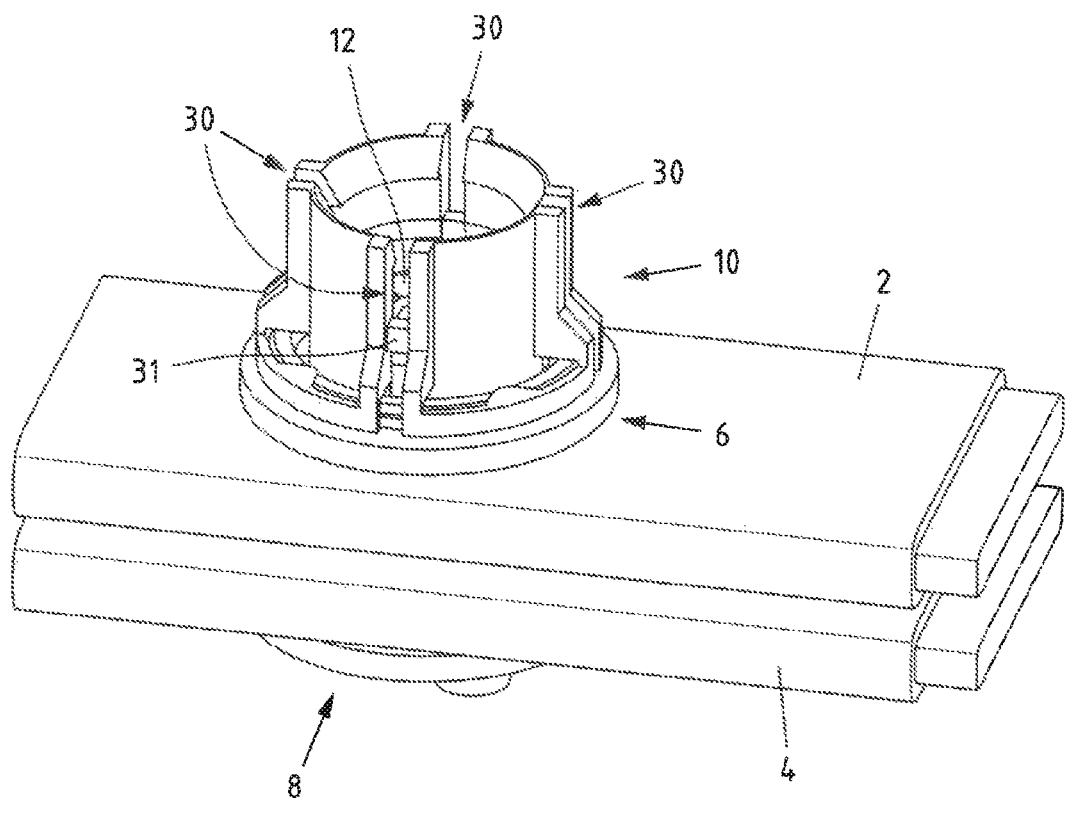
FIG. 1c the view according to FIG. 1b with latched contact protection element
Figure 1D:
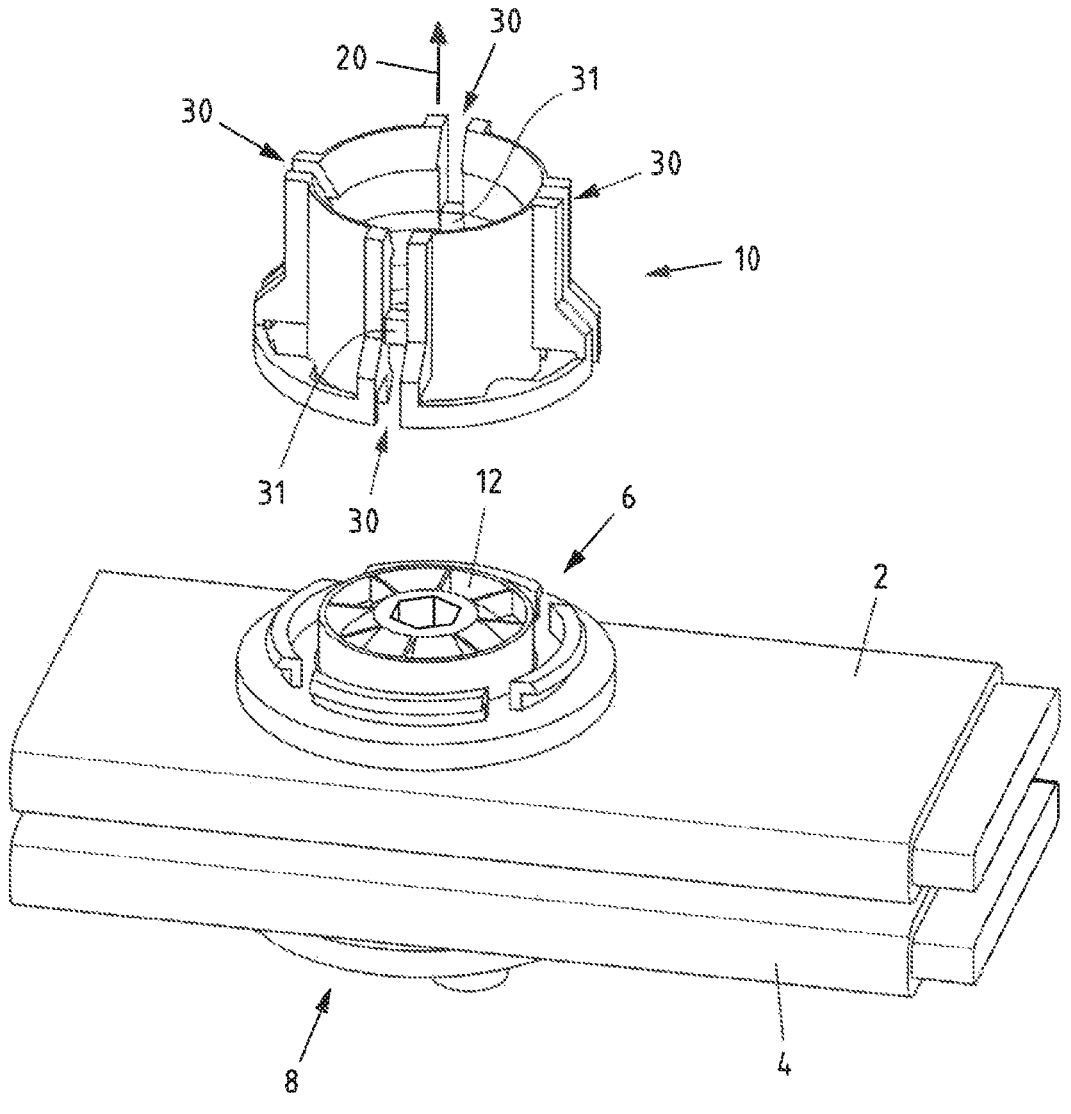
FIG. 1d the view according to FIG. 1c with the contact protection element removed.

Subsequently, as shown in FIG. 1c, the screw element 12 is screwed into the second connecting element 8 until, as shown in FIG. 1d, the contact protection element 10 can be detached from the first connecting element 6 in the direction 20. This is done by spreading the touch protection element 10 as will be described further below. The touch protection element 10 can be removed from the first connecting element 6 in the direction 20 without the use of tools.

The screw element 12 has an electrically insulating coating on the upper side, so that the first connection element 6 and the screw element 12 do not have any electrical contact surface on the upper side, thus ensuring almost complete touch protection, in particular IPXXC or IPXXD according to DIN EN 60529. In the state shown in FIG. 1d, the screw element 12 can be live, in particular due to its contact via the first connection element 6 with the conductor 2. Since the contact protection element 10 is removed, contact protection is provided via the insulating coating of the screw element 12 on its surface facing away from the conductor 2.

In FIGS. 1a-d, it can also be seen that webs 31 are provided within the slots 30. The webs 31 connect the segments of the dome 10 to each other. The webs 31 serve as connectors and/or as articulation points for radial pivoting of the wall of the dome 10. In this connection, the wall of the dome 10 in the holding region and the wall of the dome 10 in the spreading region can be pivoted against each other in the radial direction, which facilitates spreading as described and, on the other hand, improves fixing of the dome 10 to the connecting element 6, as described previously.

Figure 2A:
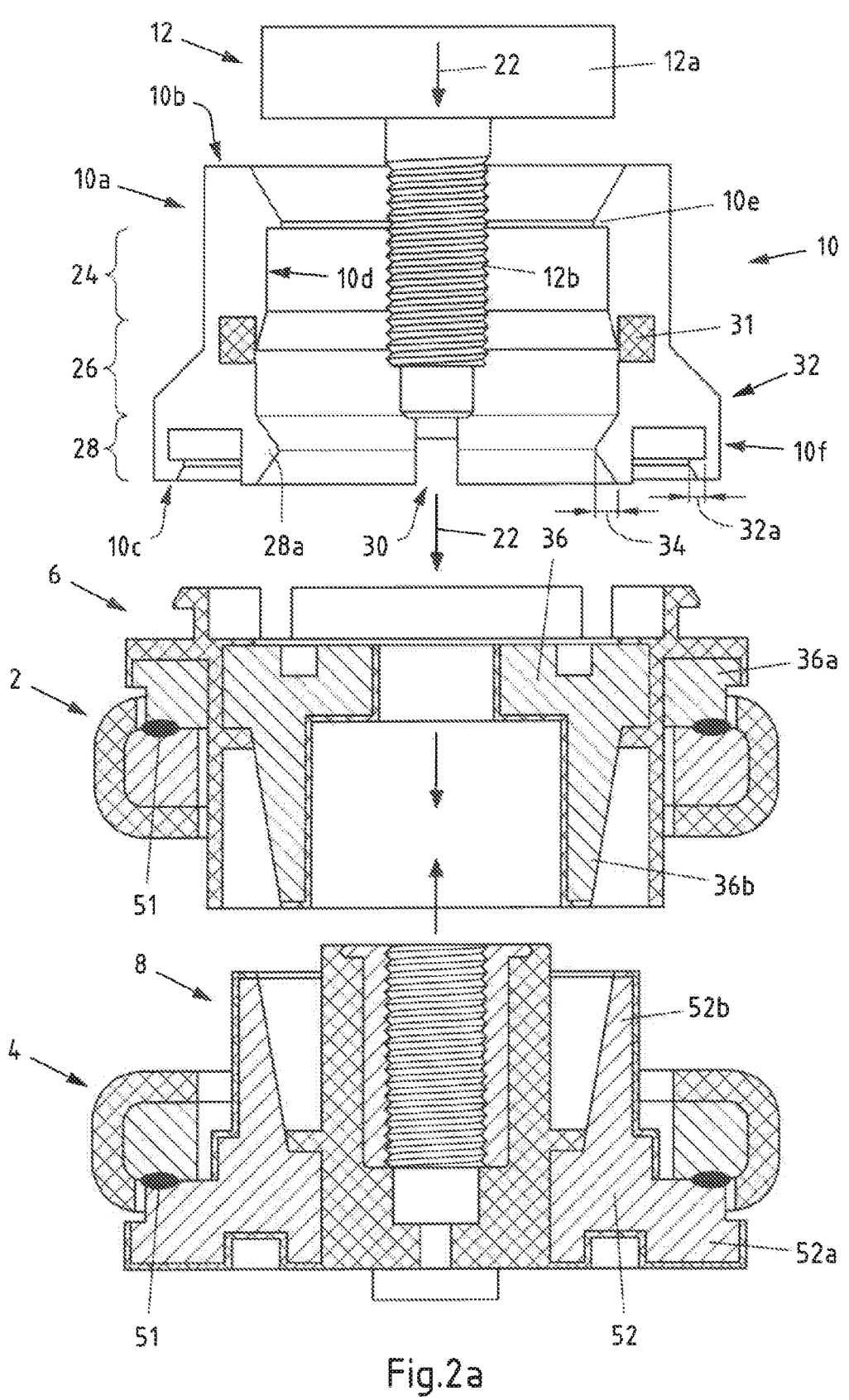

More specifically, FIG. 2a shows a screw element 12. The screw element 12 has a head 12a and a bolt 12b. The head 12a has a circumferential, preferably cylindrical, lateral surface. The bolt 12b extends away from the head 12a in an axial direction 22.

Figure 4A:
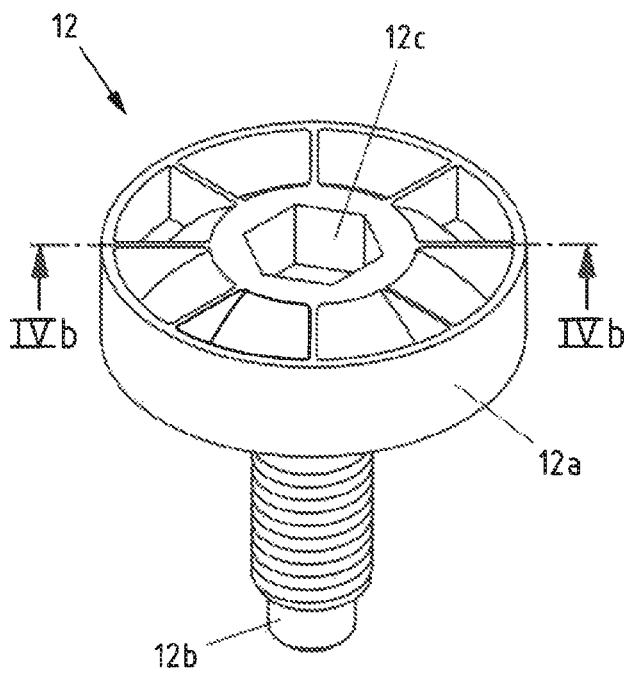
FIG. 4a,b views of a fastening element.

FIG. 4a shows the screw element 12 in a stand-alone position. It can be seen that a tool engagement 12c is provided on the head 12a on the side facing away from the bolt 12b. This can be a hexagon socket. A torx or external hexagon or octagon or cross slot or slot may also be provided. The surface of the head 12a facing away from the shaft 12a may have an insulating coating.

Figure 4B:
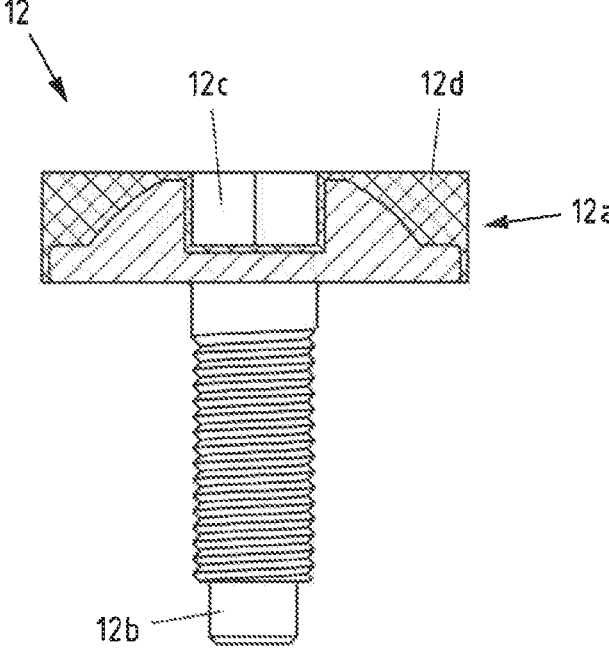

FIG. 4b shows a longitudinal section through the screw element 12. It can be seen that the head 12a has a core formed integrally with the bolt 12b. This core of the head 12a is coated with an insulating coating 12d on the side facing away from the bolt 12b. The shape of the tool holder 12c may already be formed in the core of the head 12a, or may be formed by the insulating coating 12d. The insulation 12d may be molded to the core of the head 12a.

Such a formed screw element 12 is inserted into a contact protection element 10 in an axial direction 22, as shown in FIG. 2a.

The contact protection element 10 has a mandrel 10a. The mandrel 10a has an upper end face 10b and a lower end face 10c. The upper end face 10b and lower end face 10c are opposite each other in the axial direction 22. A through opening extends through the dome 10a. The through opening is bounded by the wall of the dome 10a and has an inner lateral surface 10d. As can be seen, in a longitudinal section along the axial direction 22, the inner lateral surface 10d is profiled.

The through opening has an opening cross-section that widens toward the upper end face 10b. The opening cross-section is larger at the upper end face 10b than the cross-section of the head 12a. The screw element 12 can be inserted into the through opening with the bolt 12b and the head 12a.

In the axial direction 22, starting from the upper end face, the opening cross-section preferably tapers in such a way that it is smaller than the cross-section of the head 12a at a distance from the upper end face 10b.

Figure 2B:
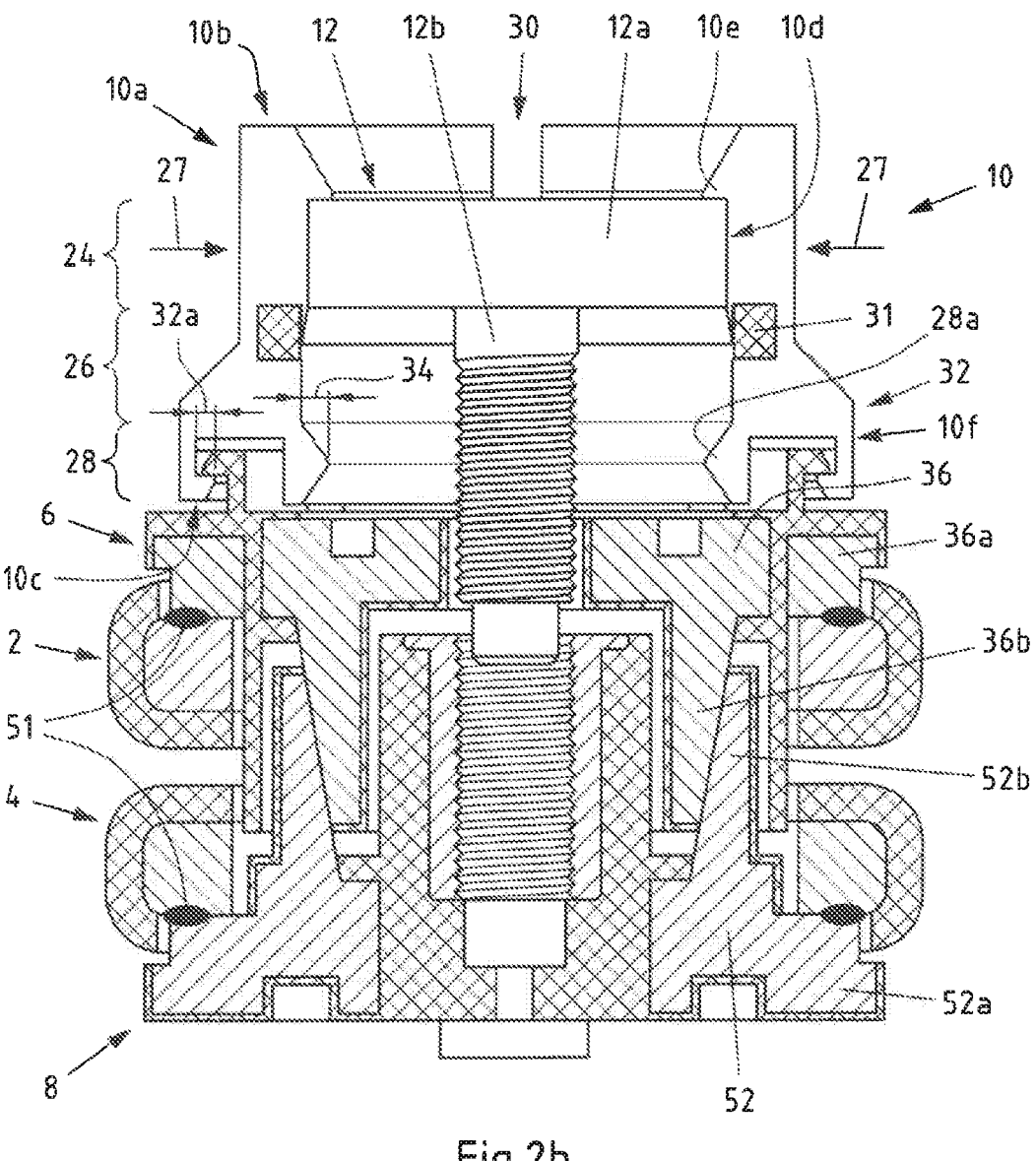
FIG. 2b a longitudinal section through a connector according to FIG. 1c in the unscrewed state.

Following this in the axial direction, a radial outward projection 10e is provided in the opening cross section. At this radial offset 10e, the opening cross section widens radially outward. The screw element 12 can be pushed with the head 12a into the through opening of the dome 10a in the axial direction 22 up to above the radial projection 10e. This position is shown in FIG. 2b. The radial offset 10e forms a stop for the head 12a.

The head 12a is held in the holding region 24. The opening cross section In the holding region 24 is equal to or smaller than the cross section of the head 12a, so that it is held in frictional engagement in the holding region 24. This position is shown in FIG. 2b. The dome 10a exerts a force in the radial direction 27 as shown in FIG. 2b on the head 12a of the screw element 12, and the screw element 12 is held in the position shown.

Adjacent to the holding region 24 in the axial direction 22 is the transition region 26. In the transition region 26, the screw element 12 can be moved freely in the axial direction 22 as shown in FIG. 2c.

Figure 2C:
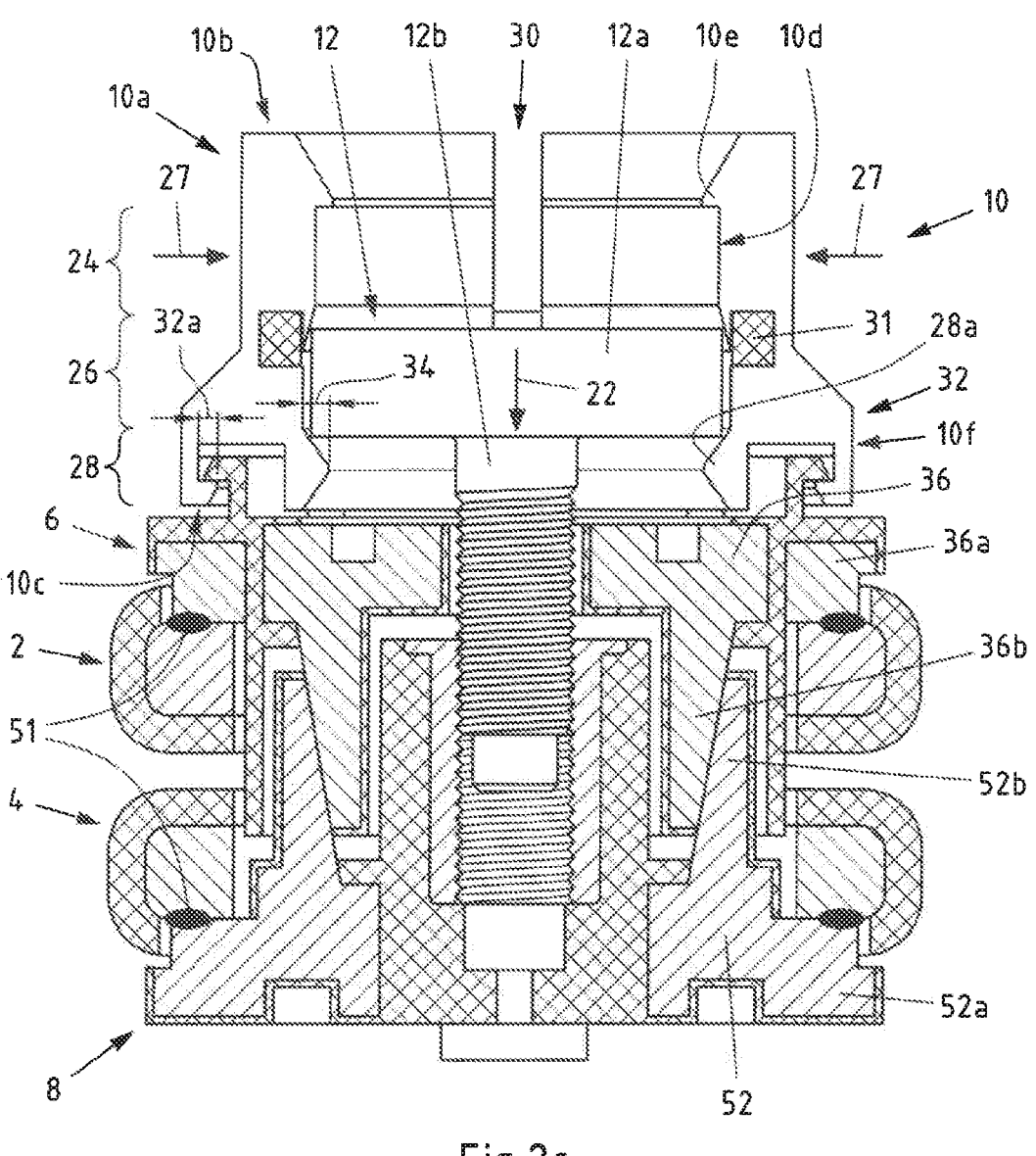
FIG. 2c a longitudinal section through a connector according to FIG. 1c in partially screwed state.

When the screw element 12 is moved in the axial direction 22 into the transition region 26, the bolt 12b, as shown in FIG. 2c, engages with the second connecting element 8 and can be screwed thereto. When screwed, the screw element 12 consequently the head 12a is moved further in the axial direction 22 in the through opening of the dome 10a. The head 12a then comes into the spreading region 28.

In the spreading region 28, a radially inward projection 28a is provided on the inner lateral surface 10d. The projection 28a may be circumferential, but preferably interrupted by slots 30. The slots 30 extend into spreading region 28 and in the region of upper end face 10 to promote spreading of the wall of the dome 10a there respectively. The slots 30 may extend in an axial direction along the dome 10a, preferably completely along the longitudinal axis of the dome. The segments of the dome 10a separated from each other by the slots 30 may be interconnected by webs 31. The webs 31 are preferably in the transition region 26. The contact protection element 10 is formed in one piece.

Figure 2D:
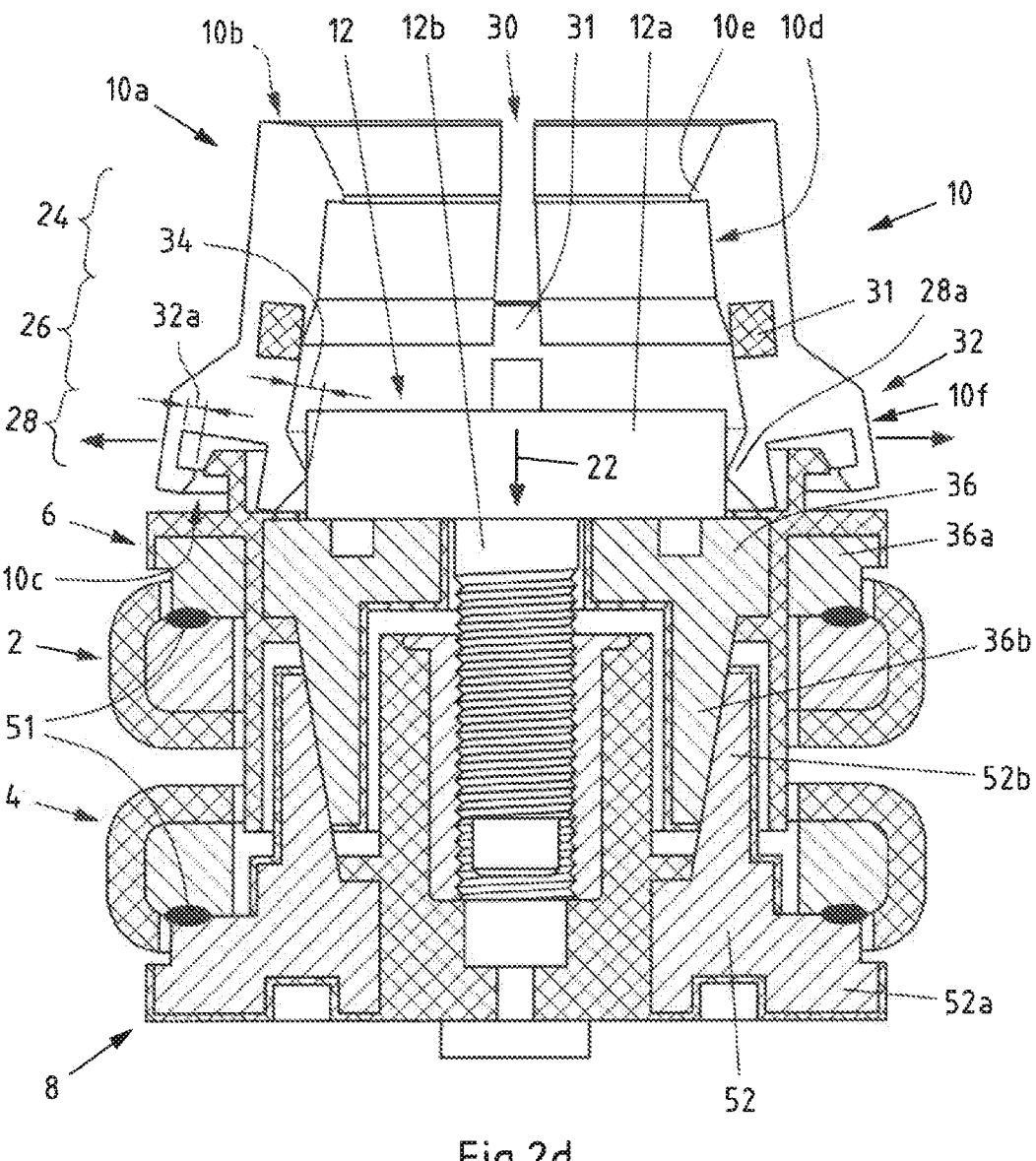
FIG. 2d a longitudinal section through a connector according to FIG. 1c in fully screwed state.

The slots 30 cause the head 12a to slide over the radial projection 10e when the screw element 12 is inserted, and the lateral surface is elastically deformed radially outwardly so that the head 12a locks behind the radial projection 10e. When the head 12a moves further in the radial direction 22, it comes into contact with the projection 28a. The slots 30 also allow the dome 10a to be elastically deformed radially outward in the spreading region 28. The lateral surface of the head 12a presses radially outward against the inner lateral surface 10d of the dome 10a. This causes the latter to expand radially outwardly as shown in FIG. 2d.

The movement of the screw element 12 in the axial direction 22 causes the dome 10a to spread due to the profiled inner lateral surface 10d.

The through opening widens again starting from the projection 28a towards the lower end face 10c. The through opening at the lower end face 10c is equal to or larger than the cross section of the head 12a. This makes it easier to fit the contact protection element 10 onto a screwed screw element 12 when it is to be fitted onto the first locking element 6 in the opposite direction 20 according to FIG. 1d.

At the lower end face 10c, the contact protection element 10 has a flange 10f. A locking element 32 is provided on the end face of the flange 10f. The locking element 32 has radially inwardly facing undercuts, as well as a gap opening towards the lower end face 10c. Through this gap, the locking element 32 can lock with a corresponding locking element of the first connecting element 6, which will be described below.

Figure 2E:
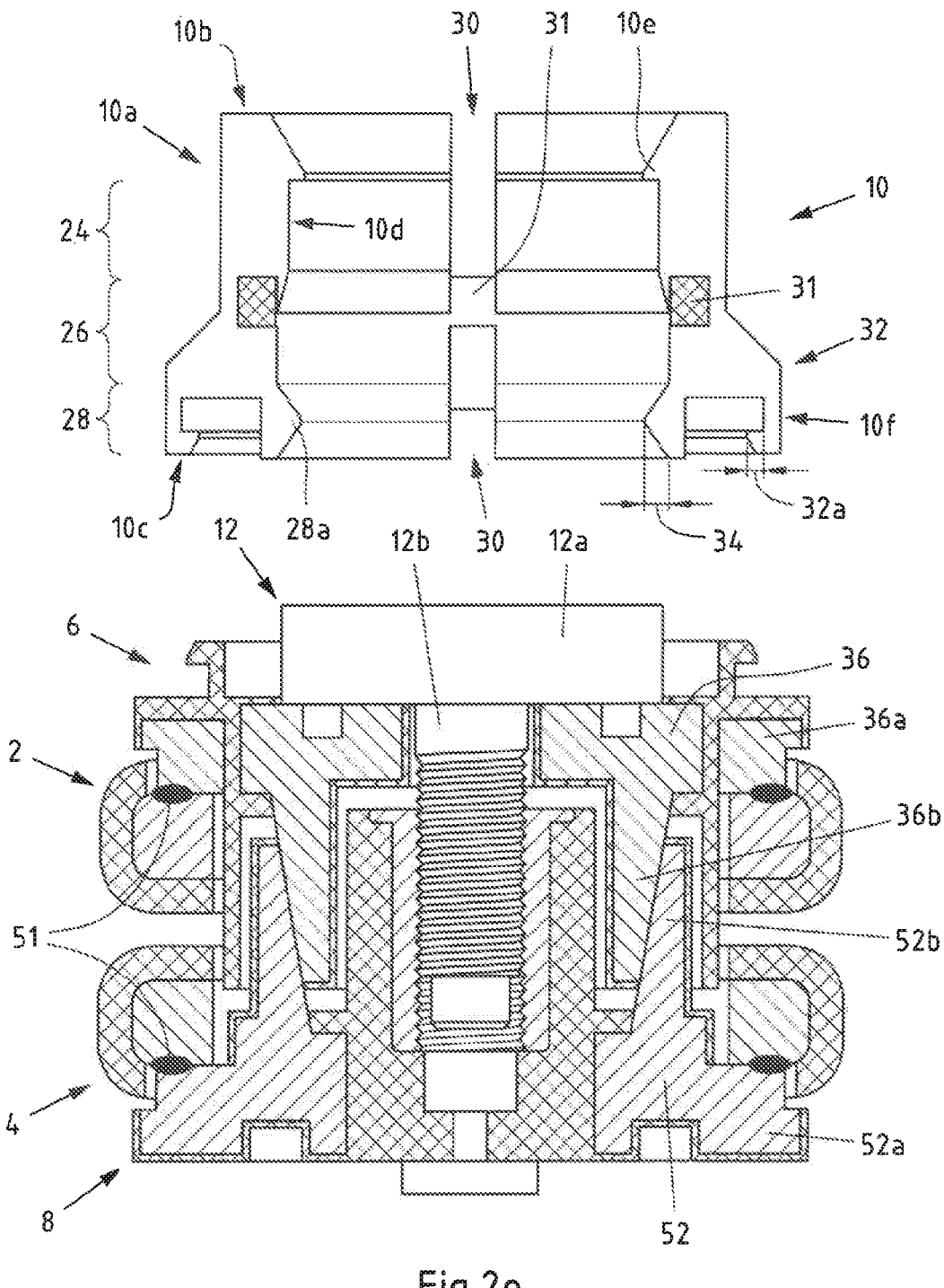
FIG. 2e a longitudinal section through a connector according to FIG. 1d.

The radial extent 32a of the undercut is preferably smaller than the radial extent 34 of the projection 28a. This ensures that, when spread, the undercut is completely disengaged from the first connecting element 6 or its locking element, as shown in FIG. 2e.

The contact protection element 10 thus provides contact protection when screwing the screw element 12 into the connecting elements 6, 8. In particular, while the bolt 12b could come into electrical contact with live parts, the contact protection element 10 as well as the insulation 12d protects the user from unwanted contact with live parts. After the screw element 12 has been completely screwed down, the touch protection element 10 can be removed as shown in FIG. 2e. Electrical contact with live parts is impossible even then, since the screw element has an insulating coating on its head 12a.

For making electrical contact, the first connecting element 6 is formed with a socket 36 comprising a collar 36a and a shaft 36b. The socket 36 is integrally formed and, in particular, is formed from an electrically conductive material.

Figure 5A:
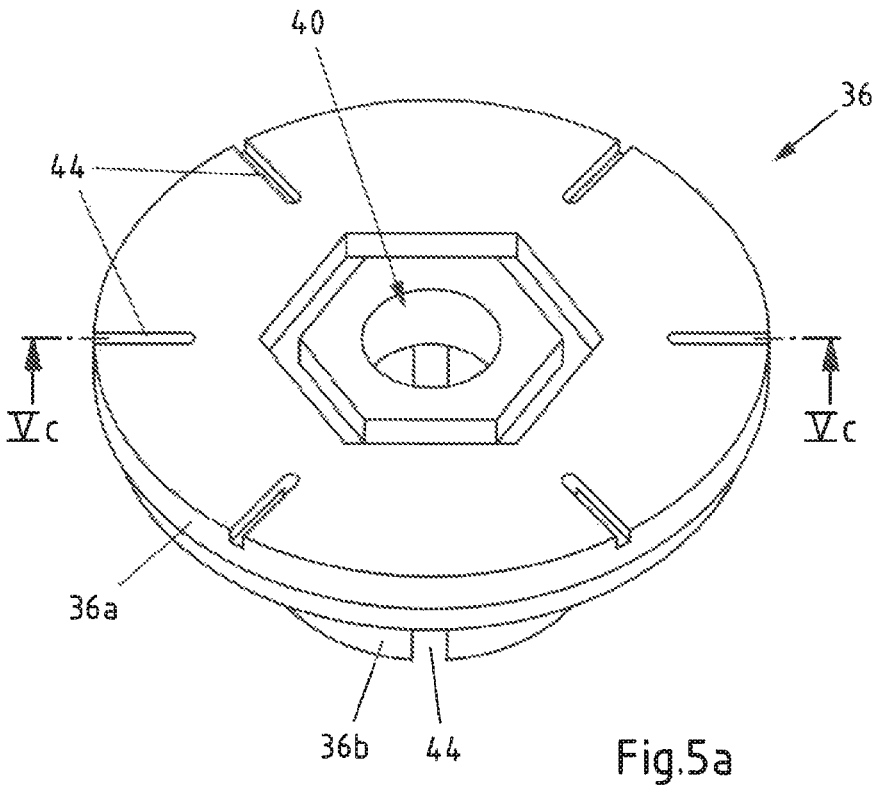
FIG. 5a a view of a socket of a first connection element.

The socket 36 made of the electrically conductive material is shown in more detail in FIGS. 5a and c. The collar 36a extends radially outwardly. The shaft 36b extends away from the collar 36a in the radial direction 22. On the side of the collar 36a facing the shaft 36b, the collar 36a has a contact surface 36c. The contact surface 36c has a flange-like shape. Further, the collar 36a has a fold 36d.

As can be seen in FIG. 2a, the fold 36d serves to cover the insulation on the conductor 2. The fold 36d is also an aid for overmolding. It forms a readily usable sealing surface in the injection mold.

The shaft 36b tapers at its outer lateral surface 38, preferably in a frustoconical shape. The socket 36 has a through opening 40. The through opening 40 extends with a first opening cross section along the collar 36a. In a transition region between the collar 36a and the shaft 36b, the opening cross-section of the through opening 40 increases.

Since the socket 36 is to be friction welded to the conductor 2, the socket 36 has a groove 42 on an upper surface for receiving torque. The groove 42 may be polygonal, in particular hexagonal.

Figure 5B:
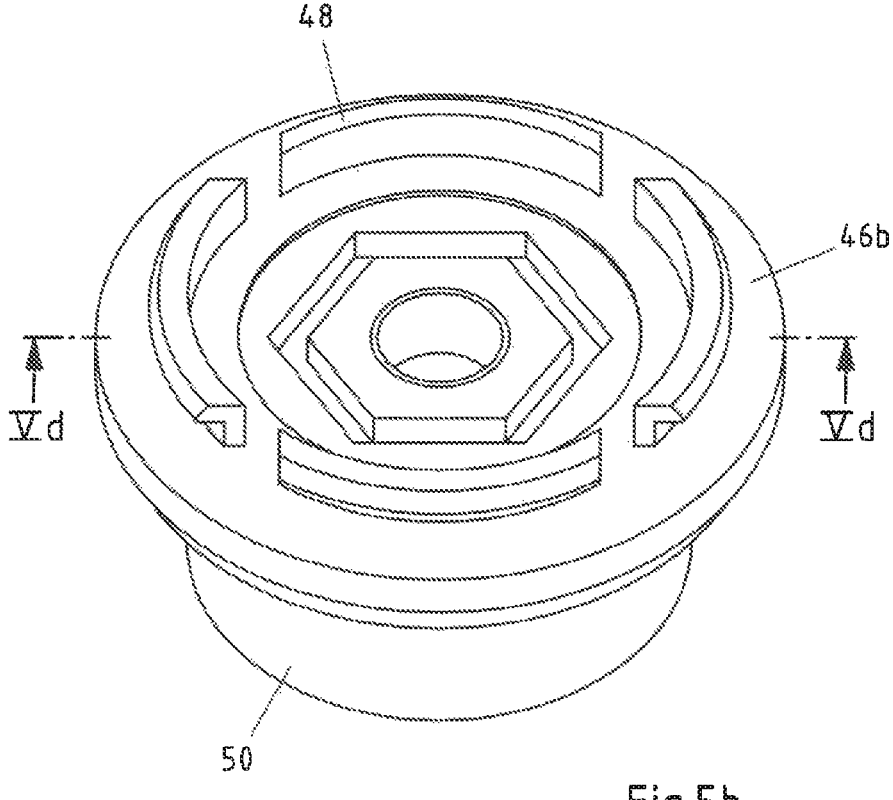

Slots 44 are provided in the socket 36 to bring insulation material to the relevant surfaces of the socket 36. In an injection molding process, the socket 36 is inserted as an insert into an injection mold and overmolded according to FIGS. 5b, 5d. In this process, an insulating coating 46a is formed along the inner lateral surface of the through hole 40. Furthermore, the collar 36a is coated with an insulating coating 46b on the side facing away from the shaft 36b.

A locking element 48 is provided in this region. The locking element 48 is integrally formed from the coating material. The locking element 48 on a ridge extending axially from the collar 36a around substantially the through opening 40. A radially outwardly facing undercut is provided on the web to engage the locking element 30 (not shown).

Circumferentially surrounding the shaft 36b, a sleeve 50 may be provided. The sleeve 50 is integrally formed from the coating material The sleeve 50 forms an annular space with the outer lateral surface 38. At the end face, an opening gap between the outer lateral surface 38 and the sleeve 50 is smaller than a test finger 82 according to IPXXB or, in particular, after joining of the connecting elements IPXXC according to DIN EN 60529, so that protection against contact is provided. The shaft 36b is coated with insulation 46a on the end face. Through the slots 44, the insulation 46a, 46b as well as the sleeve 50 and the web can be molded onto the socket 36 in a single operation during injection molding. The first connection element 6 formed in this way is shown in a view in FIG. 5b. The locking elements 48 can be seen.

Figure 5C:
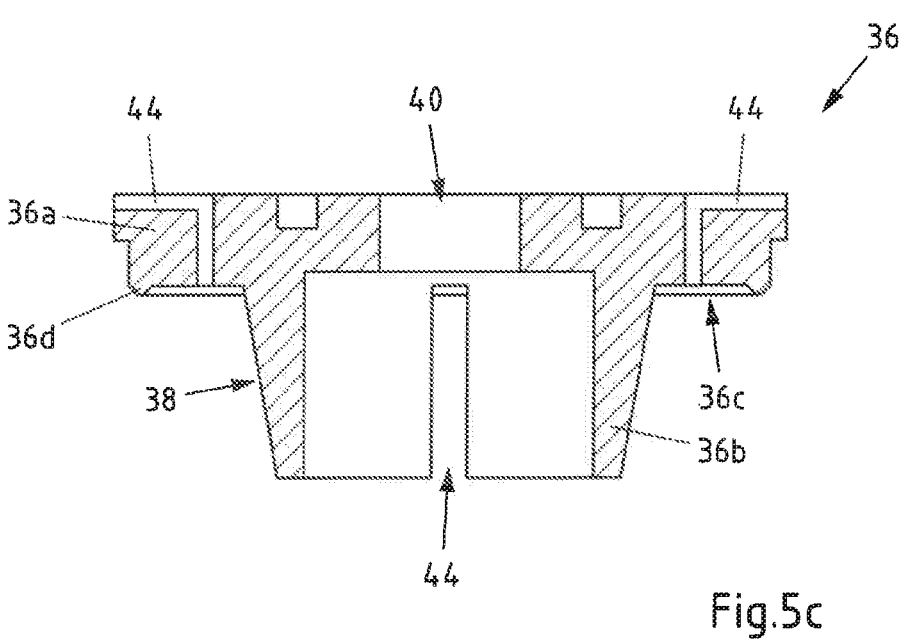
Figure 5D:
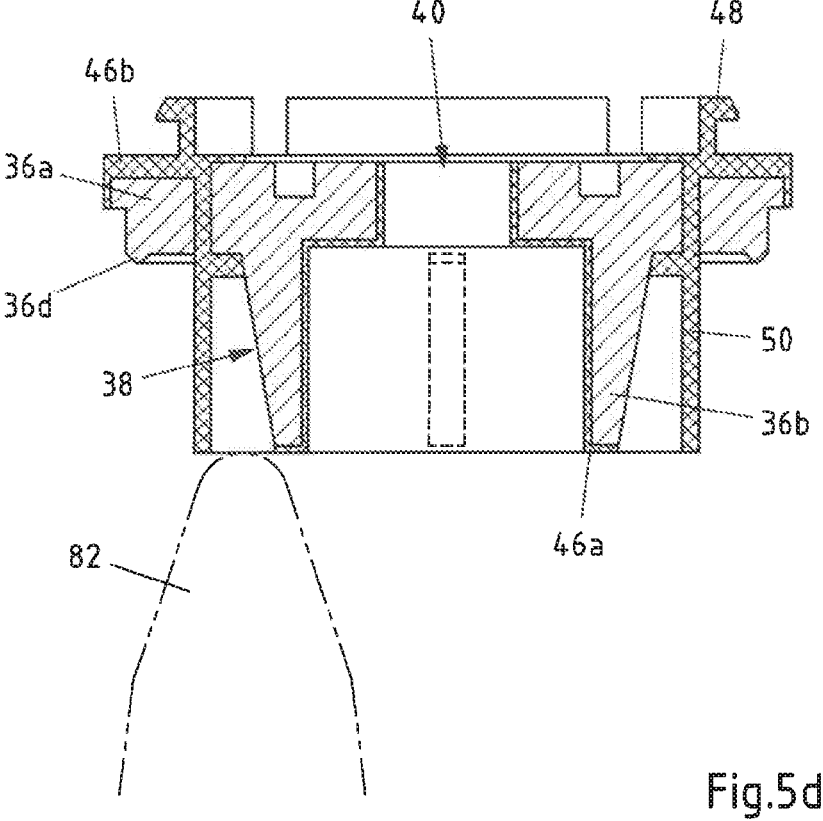
FIG. 5d a sectional view of an overmolded socket according to FIG. 5b.

This first connecting element 6 can be welded onto a conductor 2 by means of friction welding. A weld seam 51 is formed, as can be seen in FIGS. 2a-e. This weld seam 51 is favored In particular by a projection 36d extending axially on the contact surface 36, preferably circumferentially, as shown in FIG. 5c, d. The contact pressure is increased by the reduced surface region at the projection 36d, so that immediate melting of the materials is ensured in the event of friction welding. Resistance welding or soldering as well as laser welding is also possible.

As can be seen in FIGS. 2a-e, the first connecting element 6 is materially bonded to the conductor 2. Due to the overmolding of the collar 36a on the side facing away from the shaft 36b, contact protection is provided on the upper side in an region not covered by the contact protection element 10 or, in the screwed state, by the head 12a. On the lower end face 10c, the annular gap between the sleeve 50 and the outer lateral surface 38 is so small that touch protection is also provided.

Figure 6A:
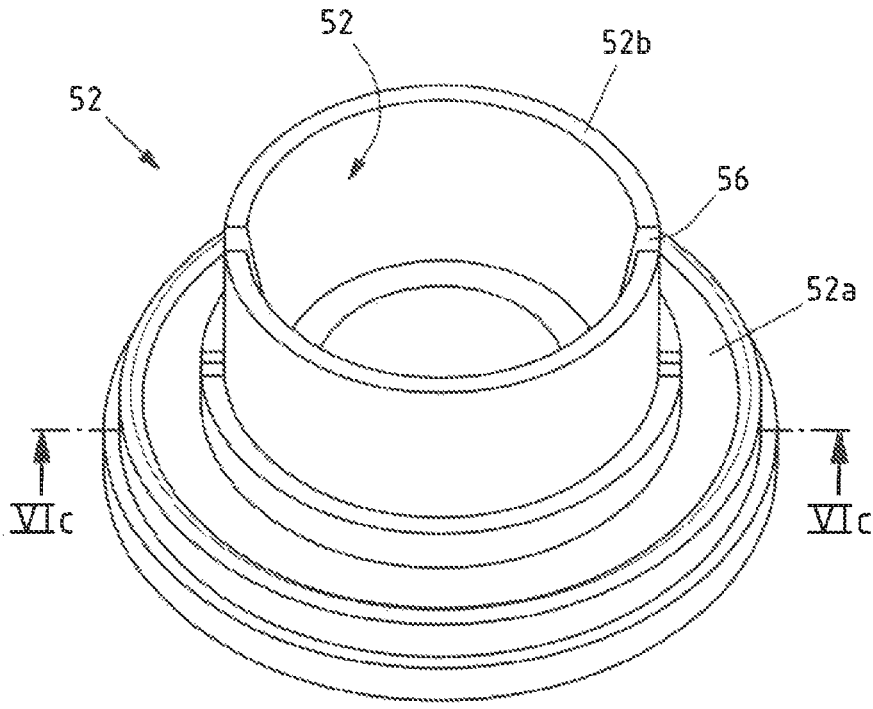
FIG. 6a a view of a socket of a second connecting element.

Finally, a second connecting element 8 may be provided. This second connecting element 8 also has a socket 52 with a collar 52a and a shaft 52b. The socket is shown in FIGS. 6a and c. It can be seen that the socket 52 has a shaft 52b extending in the axial direction and a circumferential collar 52a. The socket 52 is formed of a conductive material, the same material as the socket 36. The collar 52a is shaped complementary to the collar 36a, so that reference is made to the description there.

The shaft 52b has an inner lateral surface 54 which widens out from the collar 52a in the axial direction 22. That is, the opening cross-section of the shaft 52b widens away from the collar 52a. The collar 52a is complementary to the collar 36a, so that reference is made to the description there. The angles of inclination of the lateral surfaces, in particular the outer lateral surface 38 and the inner lateral surface 54, are congruent with each other, so that they can rest completely on each other in the connected state.

Figure 6B:
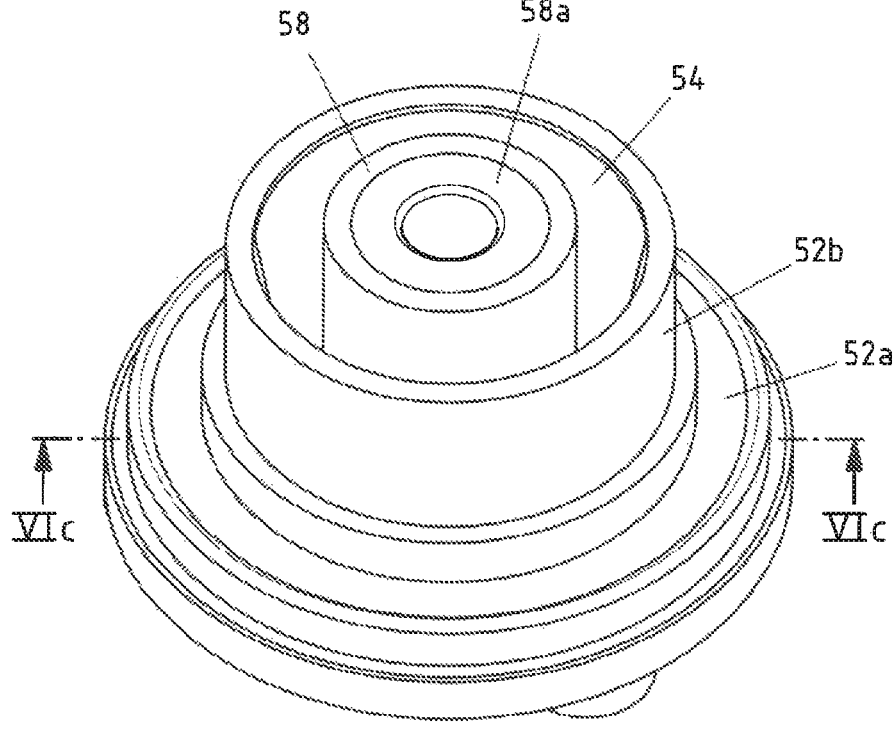
Figure 6C:
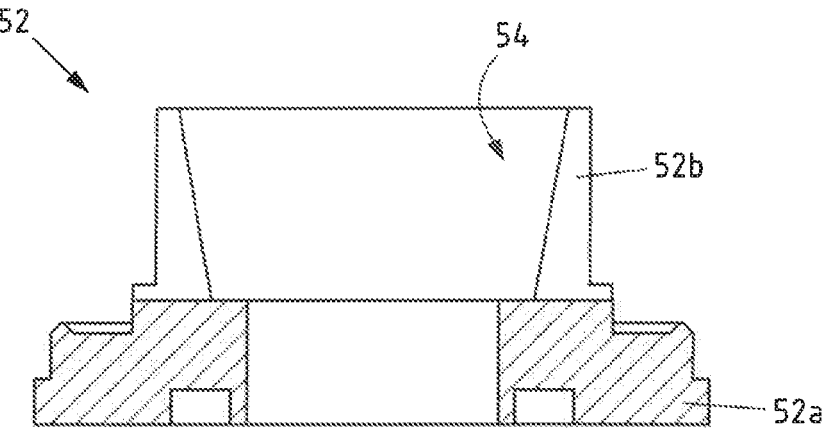
Figure 6D:
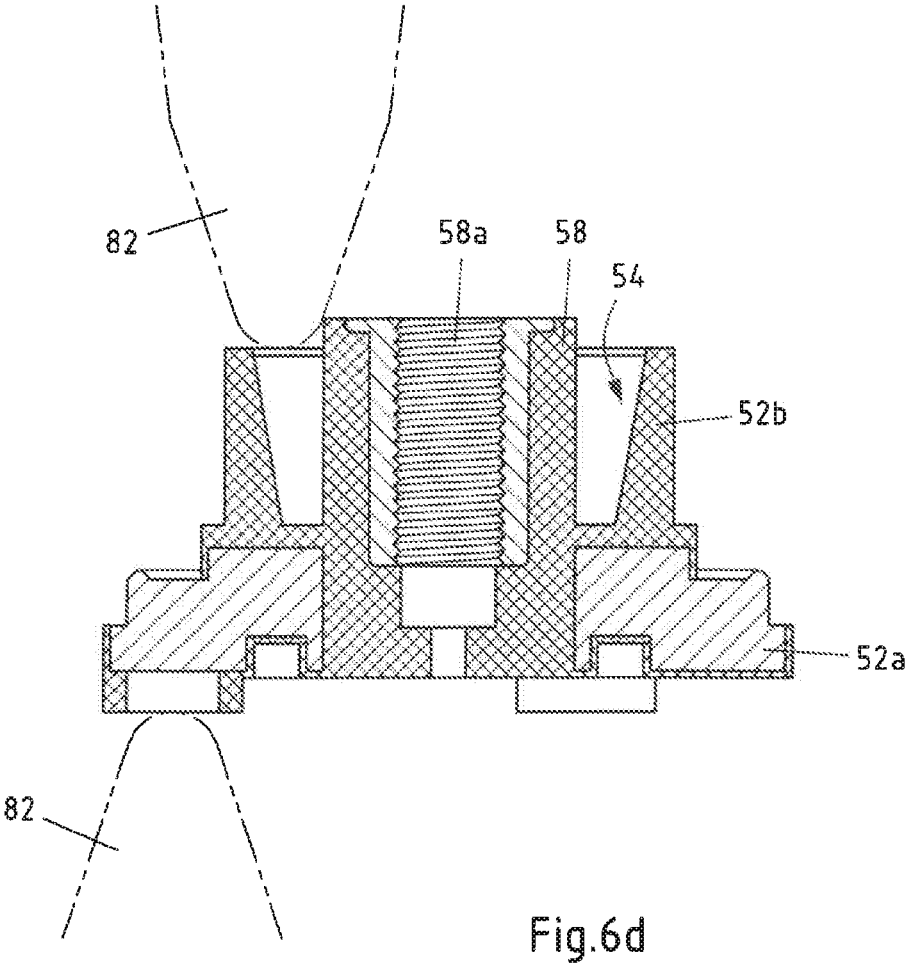
FIG. 6d a sectional view of an overmolded socket according to FIG. 6b.

The socket 52 can also be coated in an injection molding process. An overmolded socket 52 forms the second connecting element 8, as shown in FIGS. 6b and 6d. To enable overmolding in a single injection molding process, at least one slot 56 is provided in the shaft 52b. This allows injection molding material to reach both sides of the shaft 52b, particularly for forming a receiving part 58.

The shaft 52b is coated with an insulating material along its outer lateral surface and in the region of the slits 56, as can be seen in FIGS. 6b and d. In particular, an end surface of the shaft 52b is also coated with the insulating material. Free of the coating is the inner circumferential surface 54. A receiving part 58 extends inside the cup-shaped shaft 52b in the axial direction 22. This receiving part 58 is preferably formed integrally from the insulation of the socket 52.

An annular gap forming between the outer lateral surface of the receiving part 58 and the inner lateral surface 54 at the front edge is smaller than a test finger 82, so that protection against contact is provided, as shown in FIG. 6d.

Preferably, the receiving part 58 extends beyond the front edge of the shaft 52b in the axial direction 22. A threaded socket 58a is inserted into the receiving part 58. The threaded socket 58a is preferably made of a metallic material, in order to be able to absorb increased tensile forces of the screw element 12.

To establish an electrically conductive connection, the first connecting element 6 is first welded to the first conductor 2 at the weld seam 51. In addition, the second connection element 8 is welded to the second conductor 4 at the weld seam 51. The conductors 2, 4 thus fitted with the connecting elements 6, 8 can then be joined together.

For this purpose, as can be seen in FIG. 2b, the contact protection element 10 together with the screw element 12 is locked to the first connecting element 6 by means of the locking elements 32, 48, and the shafts 36b and 52b are brought into connection with their lateral surfaces, as can be seen in FIG. 2b. The outer lateral surface 38 is in contact with the inner lateral surface 54. Here, direct contact of the metallic conductive materials can be ensured.

Subsequently, as shown in FIG. 2c, the screw element 12 is screwed into the threaded socket 58a in the axial direction 22. As it is screwed into place, the screw element 12 moves within the contact protection element 10 over the holding region 24 and the transition region 26 toward the spreading region 28.

FIG. 2d shows the screw element 12 in the fully screwed-in state. The protrusion 28a spreads the dome 10a outwardly, as can be seen in FIG. 2d. The locking elements 32, 48 are released from each other.

Subsequently, as can be seen in FIG. 2e, the contact protection element 10 can be removed without tools. It can be seen that the entire connection is secured against contact.

Figure 3:
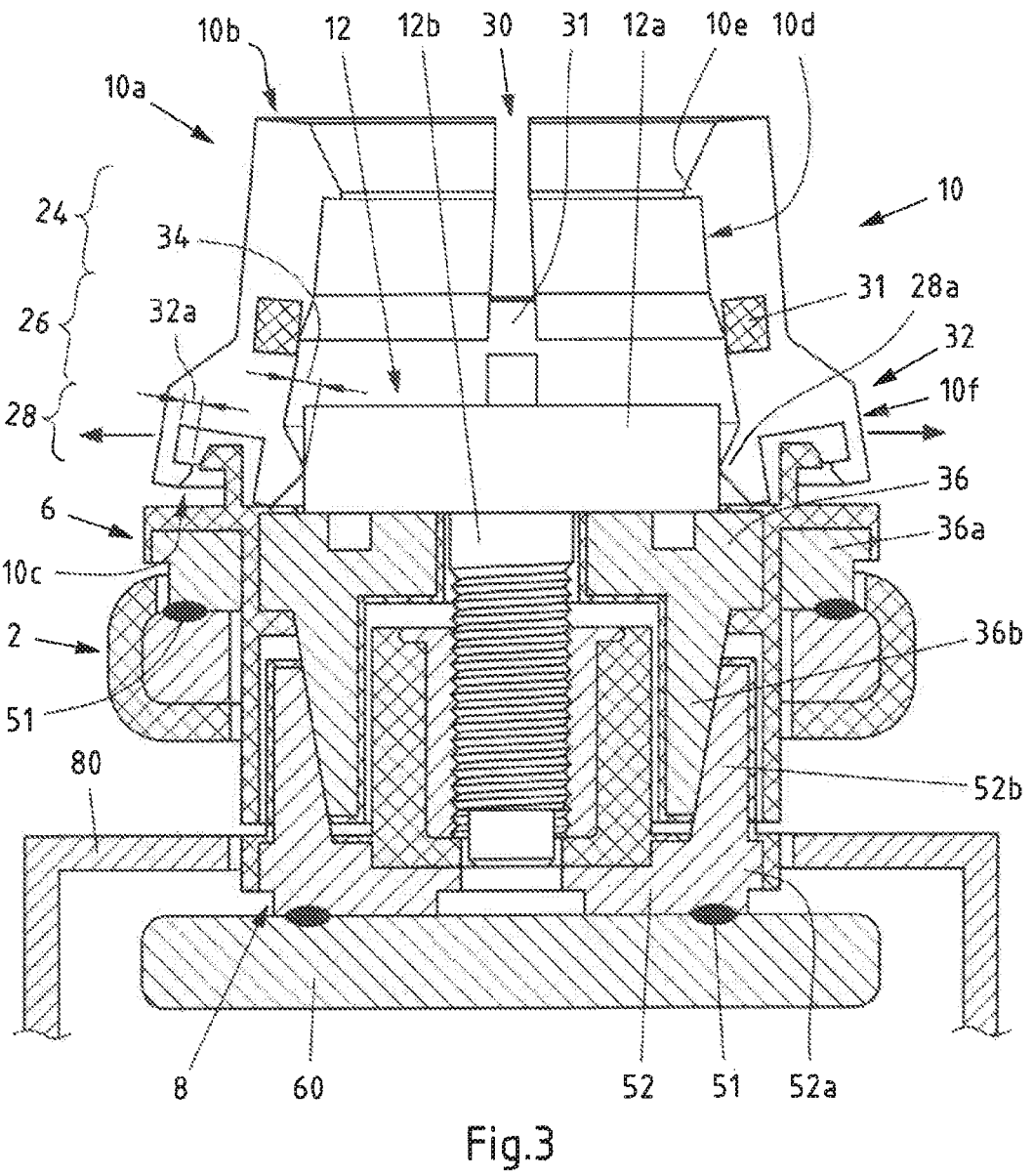
FIG. 3 a variant of a connector according to FIG. 2d.

FIG. 3 shows an embodiment in which the second connection element 8, in particular the socket 52 with the collar 52a on the side facing away from the shaft 52b, is welded to an electrical component 60. The electrical component 60 may be a conductor or a cell connector of a battery module. The other fastening and contact protection mechanism described above is retained.

The second connecting element 8 may be formed, for example, as a terminal on a battery module. In the unconnected state, contact protection is provided by the only small annular gap between the inner lateral surface 54 and the screw element 58, as shown in FIG. 6d. Accidental contact with live parts is avoided. To connect the conductor 2, for example a module connector, a first connecting element 6 is welded onto it in the manner shown. A connection can then be made with the contact protection element 10 and the screw element 12, as described above.

Figure 6E:
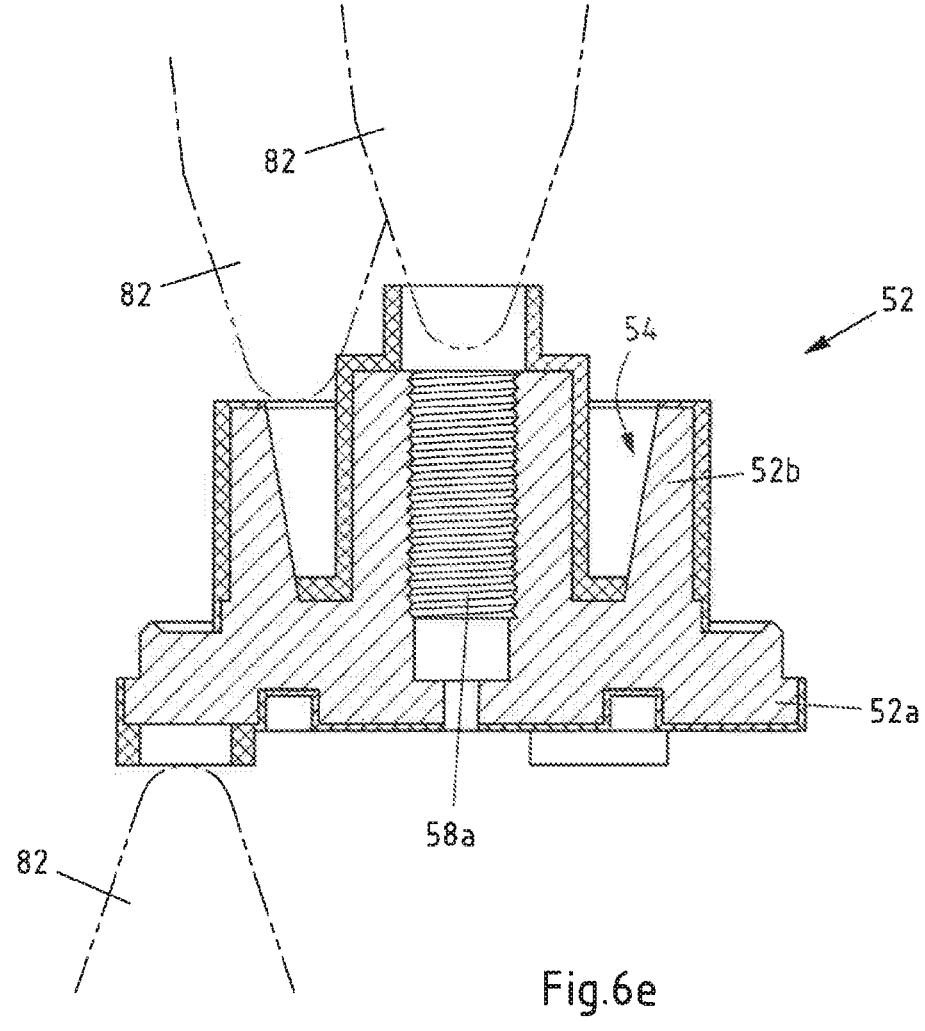
FIG. 6e a sectional view of an overmolded socket in a variant to FIG. 6d.

Alternatively to the screw element 58 with the threaded socket 58a, the threaded socket 58a can also be integrally formed from the material of the socket 52, as shown in FIG. 6e. However, it should then be noted that insulation of the socket 52 must be provided circumferentially around the threaded socket 58a at the upper end face. In this case, it may be necessary for the insulation to protrude from the end face in an axial direction, in particular at least partially circumferentially.

Figure 10:
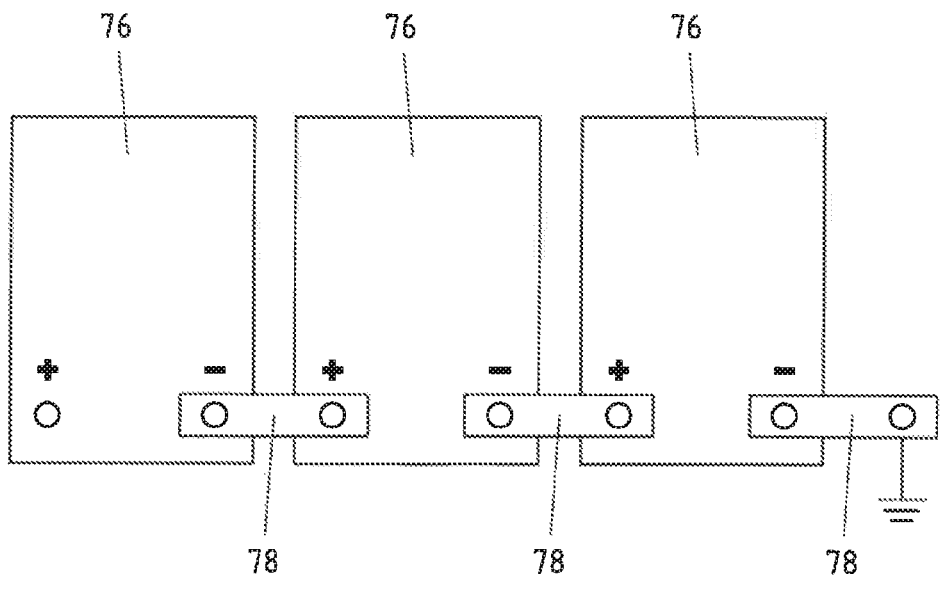
FIG. 10 a schematic view of an interconnection of battery modules.

Preferably, battery modules 76 are connected as shown in FIG. 10. Module connectors 78 formed from conductors 2, for example, may be provided with the first connecting portion 6 and the contact protection element 10. Within the battery modules 76, second conductors 4, for example electrically last cell connectors with second connecting elements 8 may be provided in each case. Contact protection is always provided during connection, which is mandatory when battery modules 76 are connected in series, since considerable voltages can build up as a result of series connection.

Figure 7:
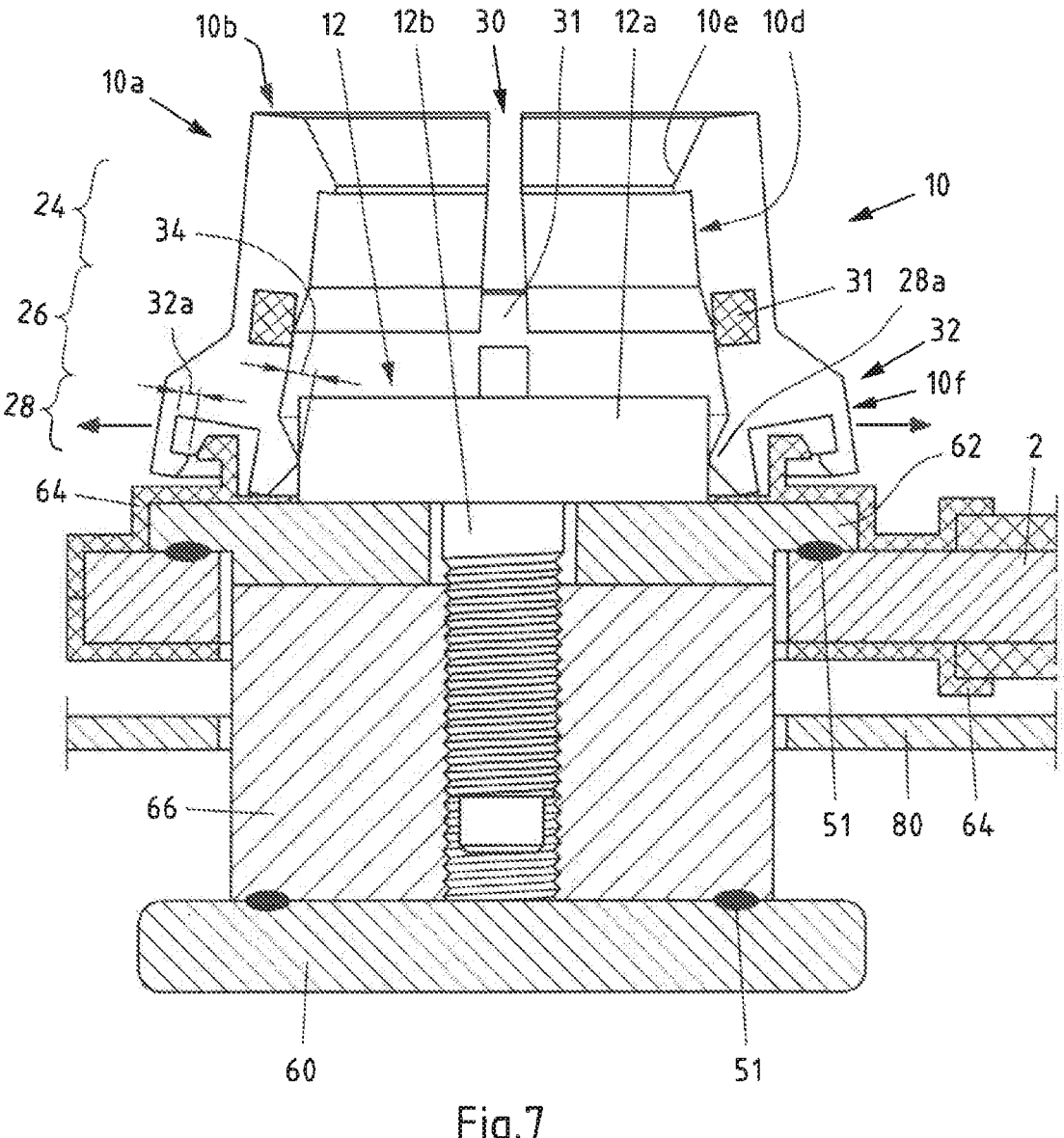
FIG. 7 an embodiment with only a first connection element, a contact protection element and a direct connection to a line.
Figure 8:
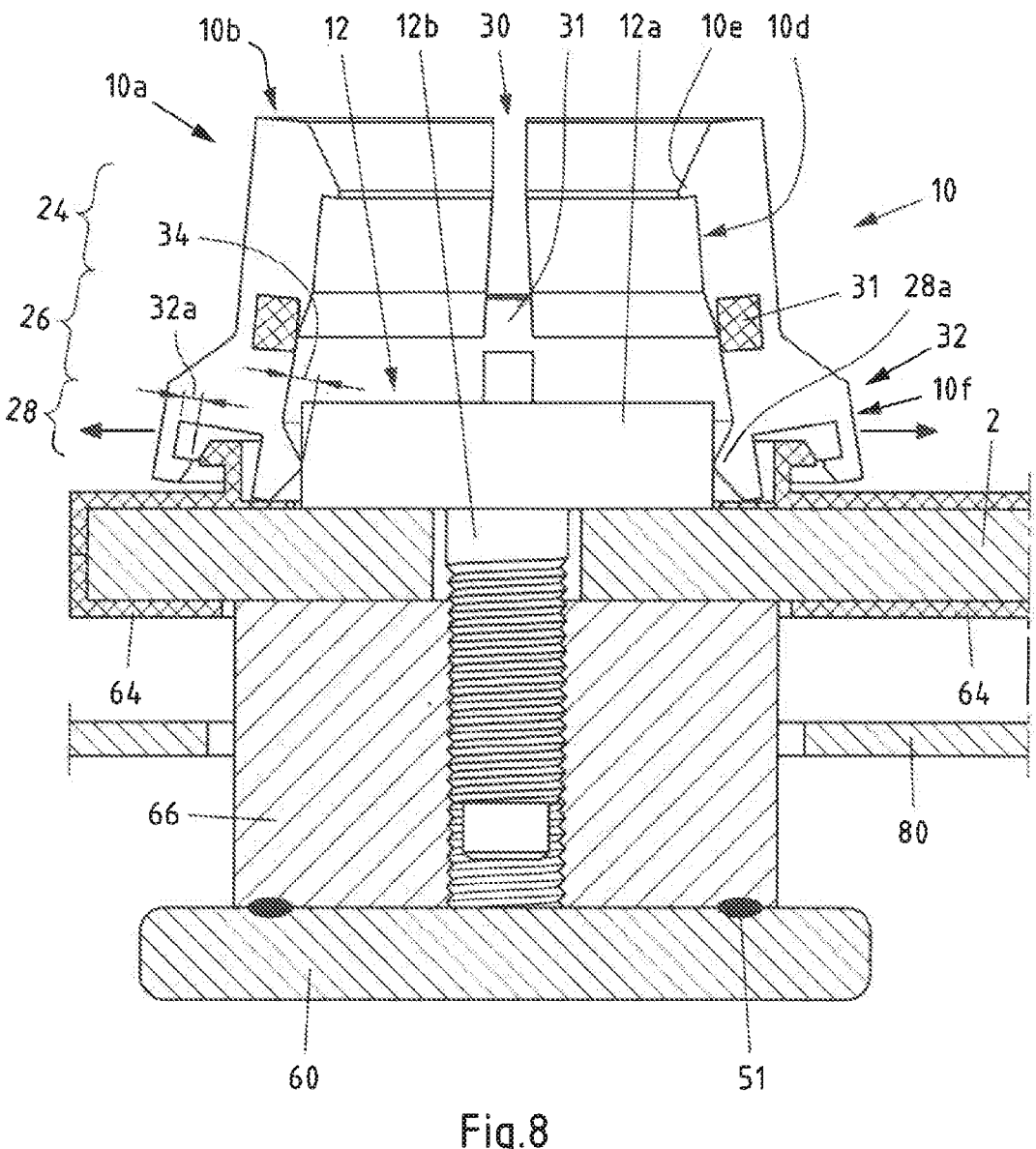
FIG. 8 a further embodiment with only a first connecting element, a contact protection element and a direct connection to a line.

In particular, for a negative terminal of a battery module in which a terminal 66 is placed on a cell connector, a connection according to FIGS. 7 and 8 can be made. This applies In particular if the module connector 78 is short and/or the pole 66 as a negative pole is first connected to the module connector 78 and only then to the respective adjacent module. During assembly, a first negative pole (on the right in FIG. 10) is first grounded via module connector 78. Then the negative pole of the respective following battery module 76 is connected to a module connector 78 in the manner shown below in FIGS. 7, 8. Only the voltage of one module 76 is applied to each of these poles. Finally, the connector 78 is connected to the positive pole of the adjacent module 76. Thus, the voltage continues to build up at the respective positive poles with each module 76. A contact protection as previously shown for FIG. 3 must also always be provided at the positive poles. Thus, a simple contact protection with only the first connection element according to FIGS. 7, 8 can be provided for the connection at each module at one pole in each case (preferably the negative pole) and the pole 66 itself can be unprotected in the unconnected state. This variant is advantageous because tolerance compensation is possible with the connection according to FIGS. 7, 8. The other pole in each case (preferably the positive pole) is also protected from contact on the pole side in the unconnected state by a contact guard as shown in FIG. 3. Due to the complementary connection elements, in particular the conically interlocking sockets and shafts, tolerance compensation is hardly possible here.

At the negative terminal, the cell connector can be connected to the module connector 78 as a flat element. Since no contact protection is required here on the module underside and on the module pole, the contact surfaces can be flat. A larger screw is also possible. This also makes sense, since the flat contact surfaces require a higher axial force to achieve the necessary contact pressure. This increases the surface region for current transmission.

However, the same head can be provided for both screws, so that the contact protection can be the same for both poles. The contact protection on both poles ensures that no live component is accessible after the module connector has been fitted, even if life-threatening voltage is already present on the fitted module connector before it is screwed on.

If contact protection is not used on the negative pole and on the underside of the module connector on this pole, then the screwing sequence plays an important role. The negative pole must always be screwed first. Otherwise it would be possible to pull off the module connector that is just to be screwed again and the module connector screwed to the positive pole would have the full voltage of the module connectors screwed in series so far freely accessible at the unprotected bottom side.

Contact protection is not only important when mounting the module connectors. Contact protection must also be ensured during disassembly, at least in accordance with IPXXB. For this reason, the removable contact protection element is designed in such a way that it can be replaced before disassembly. Once the screw has reached the end of the thread, the head is also secured again in the holding region. A prerequisite for this, however, is that the contact protection is pressed down when the screw is unscrewed. Therefore, it is suggested that a spring element is obtained on the handling device which exerts this axial pressure on the contact protection element at the moment of disassembly.

FIG. 7 shows another embodiment, in which preferably only one contact protection element 10 is used. A conductor

2 can, for example, be formed from aluminum or another rather ductile material. In order to be able to screw the screw element 12 to this conductor 2, a sleeve 62 is inserted, in particular welded, into an opening of the conductor 2. The sleeve 62 can also be understood as a welding eye, in particular a friction welding eye. The arrangement of the sleeve 62 is known per se.

A protective sleeve 64 can be placed around the sleeve 62. The protective sleeve 64 lies around the sleeve 62 and the stripped region of the conductor 2. The protective sleeve 64 has locking element 48 described in connection with the second connection element 8. This locking element 48 interacts with the locking element 32 of the contact protection element 10 in the manner described. The contact protection element 10 can be placed on the protective sleeve 64. In order to connect the conductor 2 to, for example, a pole 66, the conductor 2 together with the contact protection element 10 is placed on the pole 66 and then the screw element 12 is screwed in the described manner. In the screwed state, the contact protection element 10 can be removed. The pole 66 may be attached, in particular welded, to a last module connector (as conductor 4) in the battery module. The battery cells and the module connectors are insulating enclosed in a module housing 80. In particular, only the pole 66 is led out of the housing 80. For a battery module, plus pole (e.g. reference sign 52 according to FIG. 3) and minus pole are led out of housing 80 as pole 66.

FIG. 8 shows another embodiment, but in which the conductor 2 is formed from a material to which the screw element 12 can be screwed. In this case, the sleeve 62 is omitted. Otherwise, the screwing is carried out according to FIG. 7.

Figure 9:
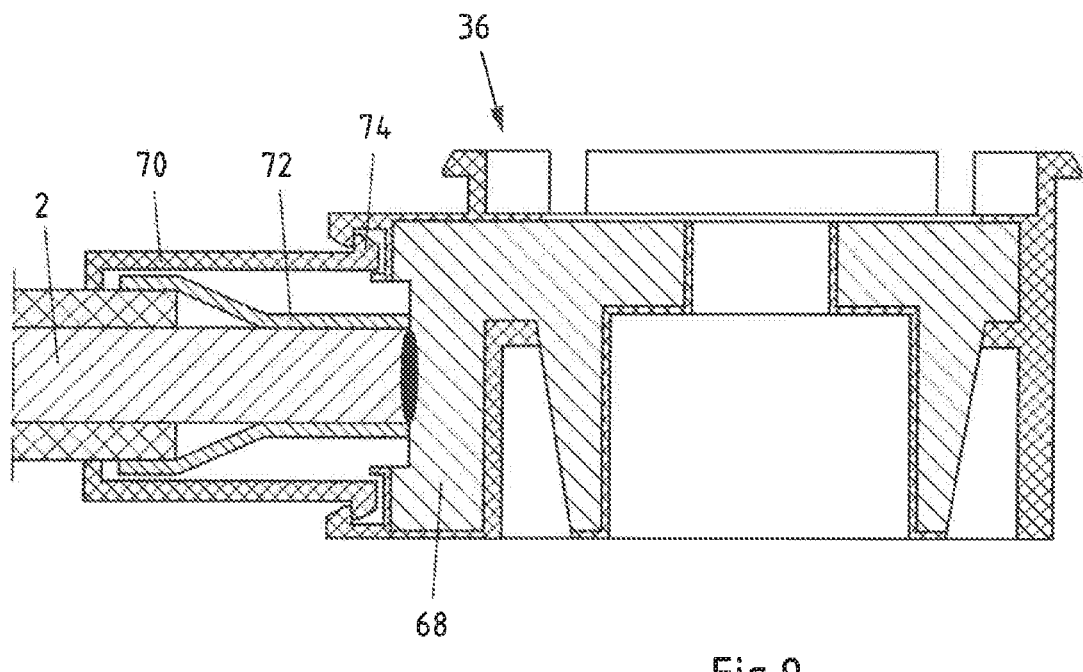
FIG. 9 an embodiment with a first connection element with a laterally attached line, in particular a round line.

It is also possible to fasten a conductor 2 laterally to a first connecting element 6. For this purpose, an axially extending connection bracket 68 is provided radially spaced from the shaft 36*b*, as shown in FIG. 9. In particular, the connection bracket 68 is formed integrally with the socket 36. A cable 2 is stripped at the end.

A fastening clip 70 or a sleeve 70 is then slid over the stripped end. In the event that the conductor 2 is formed from a stranded wire, a crimp sleeve 72 may be arranged at the end face. If necessary, the conductor 2 can be welded with crimp sleeve 72 to the outer lateral surface of the connection bracket 68. If a clip or sleeve 70 is provided, it can be latched with latching lugs 74 of the first connection element 6. A conductor 2 can be connected to another conductor in a contact-proof manner using the first connection element 6 and the contact protection element 10 and optionally the second connection element 8.

Figure 11:
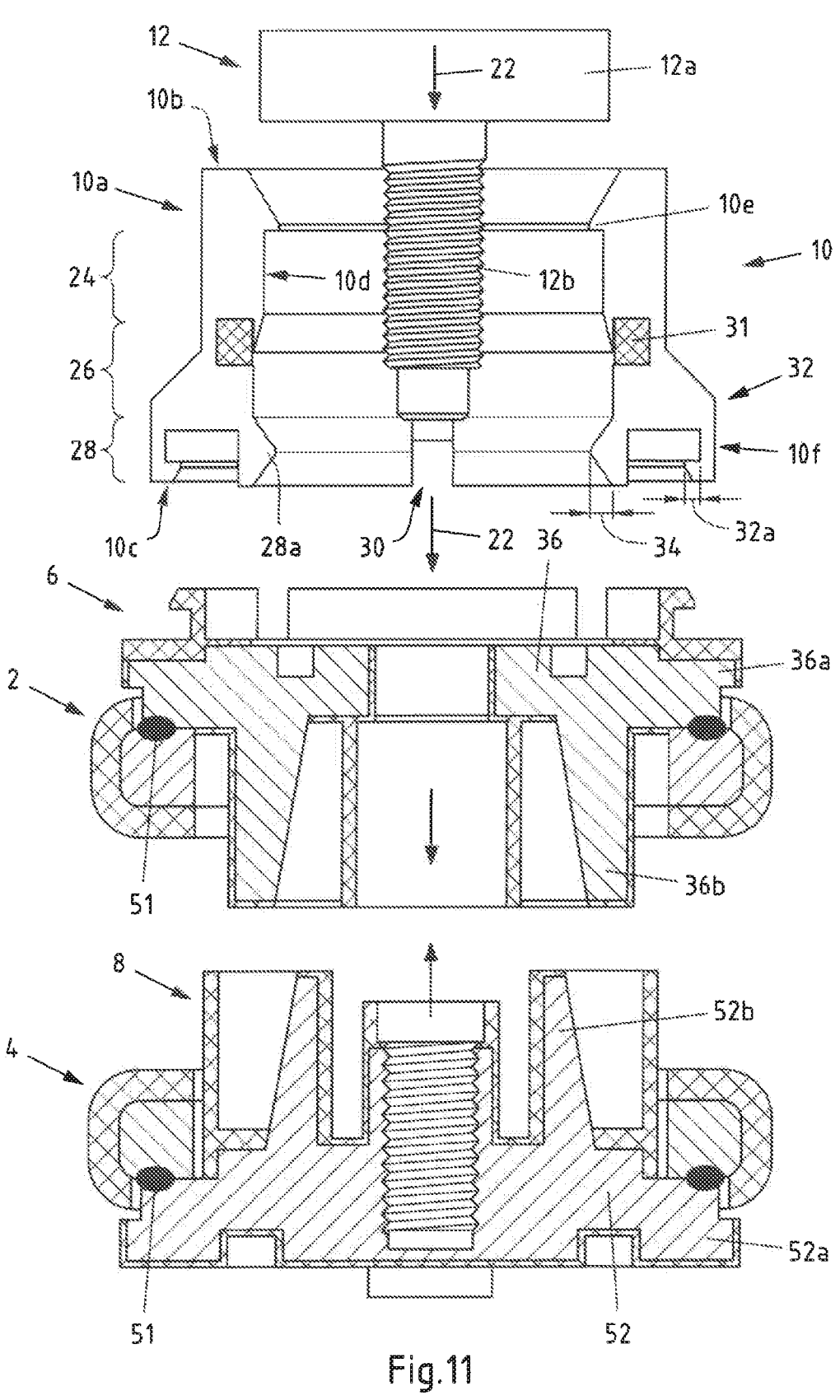

FIG. 11 shows the two connecting elements 6, 8 with reversed shapes of sockets 36, 52 and shafts 36*b*, 52*b* with respect to FIG. 2. On the first connecting element 6, the shaft 36 is not insulated on its inner lateral surface. The shaft 36*b* is cup-shaped and flares out toward the lower end surface. Within the shaft 36*b* is a tubular element that is concentric with the through opening at the collar, and through which the fastening element 12 can be slid. The tubular element is non-conductive, and In particular is integral with the insulation of the outer lateral surface of the shaft 36*b*. The annular gap between the tubular element and the inner lateral surface of the shaft 36*b* is preferably so small that a test finger cannot reach the conductive lateral surface.

The complementary shaft 53*b* is not insulated at its outer lateral surface. In the connected state of the connecting elements 6, 8, the outer surfaces of the shafts 36*b*, 52*b* lie directly against each other in a conductive manner. As previously with the first connecting element 6, here with the second connecting element 8 a substantially circumferential sleeve is arranged around the shaft 52*b*. For receiving the fastening element 12 and the tubular element, a recess is provided in the shaft 52*b* into which the tubular element can be inserted. In this case, the sheath surface at the recess is also insulated.

The previously described elements of the connecting elements 6, 8 are also provided in the embodiment according to FIG. 11, but in part on the respective other connecting element. The description nevertheless applies to both embodiments. The described contact protection element can also be used here in the same way.

REFERENCE SIGNS

2, 4 conductor/Line
6 first connecting element
8 second connecting element
10 contact protection element
10*a* dome
10*b* screw side
10*c* insertion side
10*d* inner lateral surface
10*e* radial projection
10*f* flange
12 screw element
12*a* head
12*b* bolt
12*c* tool face
12*d* insulation
14-20 direction
22 axial direction
24 holding region
26 transition region
28 spreading region
28*a* protrusion
30 slot
32 locking element
32*a* radial undercut
34 radial expansion
36 socket
36*a* collar
36*b* shaft
36*c* contact surface
36*d* projection
38 outer lateral surface
40 through hole
42 groove
44 slot
46*a, b* insulation
48 locking element
50 sleeve
52 socket
52*a* collar
52*b* shaft
54 inner lateral surface
56 slot/gap
58 screw element
58*a* threaded bush
62 sleeve
64 protective sleeve
66 battery terminal
68 bracket
70 clip
72 crimp sleeve
74 locking element
76 battery module

80 module housing
82 test finger

What is claimed is:

1. A connector, in particular battery module connector for vehicles with an electric drive, comprising:
    a first connecting element, which can be connected in an electrically conductive manner to a second connecting element, wherein the first connecting element has a socket with an axially extending shaft, and the shaft has a through opening and a radially extending collar; and
    a screw element and a contact protection element arranged on the first connecting element, wherein the contact protection element is arranged on a side of the socket facing the radially extending collar,
    wherein the contact protection element has a dome and the screw element is guided axially movable in the dome,
    wherein the screw element has a radially extending head and an axially extending bolt, the head bearing against at least elements of an inner lateral surface of the dome, and
    wherein the inner lateral surface is profiled along a longitudinal section, parallel to the longitudinal axis of the fastening element, of the dome, in the axial direction such that the opening cross section of the dome varies.

2. The connector of claim 1, wherein an opening cross-section of the dome defined by the inner lateral surface in a holding region facing away from the collar is such that the screw element is held with its head axially, in particular frictionally, against the inner lateral surface of the dome.

3. The connector of claim 1, wherein an opening cross section of the dome defined by the inner lateral surface in a spreading region facing the collar is such that the screw element exerts with its head a radially outwardly pointing force on the lateral surface of the dome.

4. The connector of claim 3, wherein an opening cross-section of the dome defined by the inner lateral surface is in clearance fit with the circumference of the head in a transition region lying between the holding region and the spreading region.

5. The connector according to claim 1, wherein on the surface of the collar facing the dome a locking element is arranged which corresponds to a locking element arranged on the dome, in particular that the locking elements engage behind each other in radial direction.

6. The connector of claim 5, wherein
    the locking element arranged on the surface of the collar facing the dome has an undercut closed towards the dome and pointing radially towards the dome, and/or
    the locking element arranged on the dome has an undercut which is open towards the dome and points radially away from the dome.

7. The connector of claim 6, wherein an overlap of the undercuts in the connected state is smaller than or equal to a taper of the radius of the opening cross section in the spreading region.

8. The connector of claim 5, wherein an axial extension of the transition region or of the transition region and spreading region is smaller than an axial extension of the bolt, so that in the unconnected state of the connecting elements the head lies in the holding region.

9. The connector of claim 8, wherein the dome is slotted in the spreading region.

10. The connector of claim 8, wherein the locking element on the dome is located in the spreading region.

11. The connector of claim 5, wherein the bolt is formed as a screw or threaded socket.

12. The connector of claim 5, wherein an outer lateral surface of the shaft tapers in an axial direction pointing away from the collar.

13. The connector of claim 5, wherein an electrically insulating collar engages at least partially circumferentially around the shaft, and an annular space is formed between the collar and the shaft.

14. The connector of claim 5, wherein an inner lateral surface of the through opening is coated in an electrically insulating manner.

15. The connector of claim 5, wherein the collar is partially electrically insulating coated on the side facing the shaft and is partially uncoated, the uncoated region being formed as a contact surface for an electrical conductor.

16. The connector of claim 15, wherein the collar is connected to the conductor in its uncoated region by material bonding, in particular by soldering or welding, in particular by friction welding.

17. The connector of claim 5, wherein the collar has a radially outer fold for receiving an insulation of the conductor.

18. The connector of claim 5, wherein the collar is at least partially electrically insulating coated on the side facing the dome, the locking element preferably being integrally formed from the coating.

19. The connector of claim 5, wherein the head of the screw element is coated in an electrically insulating manner on its surface facing away from the dome.

20. The connector of claim 5, wherein the electrically insulating coating is injection-molded onto the connecting element.

21. A connector comprising:

a first connection element, wherein the first connection element has a socket with an axially extending shaft and the shaft has a through opening with a radially extending collar, wherein a first screw element and a contact protection element are arranged on the first connection element, wherein the contact protection element is arranged on the side of the socket facing the collar of the socket, wherein the contact protection element has a dome and the first screw element is guided axially movable in the dome, wherein the first screw element has a radially extending head and axially extending bolt, the head bearing against at least elements of an inner lateral surface of the dome, and the inner lateral surface is profiled along a longitudinal section, parallel to the longitudinal axis of the fastening element, of the dome, in the axial direction such that the opening cross-section of the dome varies;

a second connection element, wherein the second connection element has a socket with an axially extending cup-shaped shaft and a radially extending collar, and wherein the second connection element has a second screw element extending axially into the cup-shaped shaft, wherein the opening of the cup-shaped shaft widens in an axial direction away from the collar and the screw element is at least partially insulated from the collar;

wherein the shaft of the first connection element engages the shaft of the second connection element, and the first screw element is engaged with the second screw element through the through opening of the shaft of the first connection element, and in an unthreaded state the head is retained in the holding region, in a transitional state between the unthreaded state and a fully threaded state, the head is in the transitional region, and in the fully threaded state, the head is in the spreading region and spreads the dome radially outward.

22. The connector of claim 21, wherein the shaft of the first connection element engages the shaft of the second connection element axially at least partially in the region of the electrical conductor.

23. The connector of claim 21, wherein an axial extension of the shaft of the first connecting element and/or of the shaft of the second connecting element is smaller than a material thickness of an electrical conductor connected to the collar of the first connecting element and/or a material thickness of an electrical conductor connected to the collar of the second connecting element, in particular that a build-up height of the two electrical conductors together is smaller than an axial extension of the shaft of the first connecting element and/or of the shaft of the second connecting element.

* * * * *